(12) United States Patent
Tomofuji et al.

(10) Patent No.: US 7,756,416 B2
(45) Date of Patent: Jul. 13, 2010

(54) OPTICAL COMMUNICATION NODE AND OPTICAL NETWORK SYSTEM

(75) Inventors: Hiroaki Tomofuji, Kawasaki (JP); Takuji Maeda, Kawasaki (JP); Yuji Shimada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 921 days.

(21) Appl. No.: 10/437,224

(22) Filed: May 14, 2003

(65) Prior Publication Data

US 2003/0223745 A1 Dec. 4, 2003

(30) Foreign Application Priority Data

May 30, 2002 (JP) .............................. 2002-157838

(51) Int. Cl.
*G02F 1/00* (2006.01)
*H04J 14/00* (2006.01)

(52) U.S. Cl. .............................................. 398/2; 398/3
(58) Field of Classification Search .................. 398/9, 398/17, 32, 5
See application file for complete search history.

(56) References Cited

U.S. PATENT DOCUMENTS

| 5,533,006 | A | * | 7/1996 | Uchida ........................ 370/222 |
| 5,537,393 | A | * | 7/1996 | Shioda et al. ................ 370/223 |
| 5,636,205 | A | * | 6/1997 | Suzuki et al. ................ 370/224 |
| 6,025,941 | A | * | 2/2000 | Srivastava et al. ............... 398/7 |
| 6,049,523 | A | * | 4/2000 | Anderson et al. ............ 370/217 |
| 6,122,082 | A | * | 9/2000 | Fishman ........................ 398/1 |
| 6,137,603 | A | * | 10/2000 | Henmi ............................ 398/4 |
| 6,219,161 | B1 | * | 4/2001 | Chang et al. ................... 398/79 |
| 6,980,736 | B1 | * | 12/2005 | Fee et al. ....................... 398/19 |
| 7,046,619 | B2 | * | 5/2006 | Alagar et al. ............... 370/216 |
| 7,277,631 | B1 | * | 10/2007 | Iyer et al. ....................... 398/1 |
| 2002/0118410 | A1 | * | 8/2002 | Manganini et al. .......... 359/110 |
| 2003/0043432 | A1 | * | 3/2003 | Marmur et al. ............. 359/152 |

FOREIGN PATENT DOCUMENTS

| JP | 7-264228 | 10/1995 |
| JP | 10-233735 | 9/1998 |
| JP | 2001-358666 | 12/2001 |
| WO | WO 01/05083 | 1/2001 |

OTHER PUBLICATIONS

J. Zyskind et al., "Fast Link Control Protection for Surviving Channels in Multiwavelength Optical Networks", ECOC' 96 1996.*
Communication from the Japanese Patent Office mailed May 8, 2007.

* cited by examiner

*Primary Examiner*—Shi K Li
(74) *Attorney, Agent, or Firm*—Staas & Halsey LLP

(57) ABSTRACT

The present invention relates to prevention of erroneous connection in an optical network and, in particular, it provides an optical communication node having route switching function as well as an optical network system using the same in a wavelength division multiplex (WDM) network system. There is provided an optical communication node that is connected to a specific optical path in an optical network, the optical communication node having: an external network that is placed thereunder; and an interruption part for interrupting connection between the optical network and the external network, wherein the interruption part interrupts the connection until a sequence of changing a route is completed when the route setting of the optical path is changed.

6 Claims, 22 Drawing Sheets

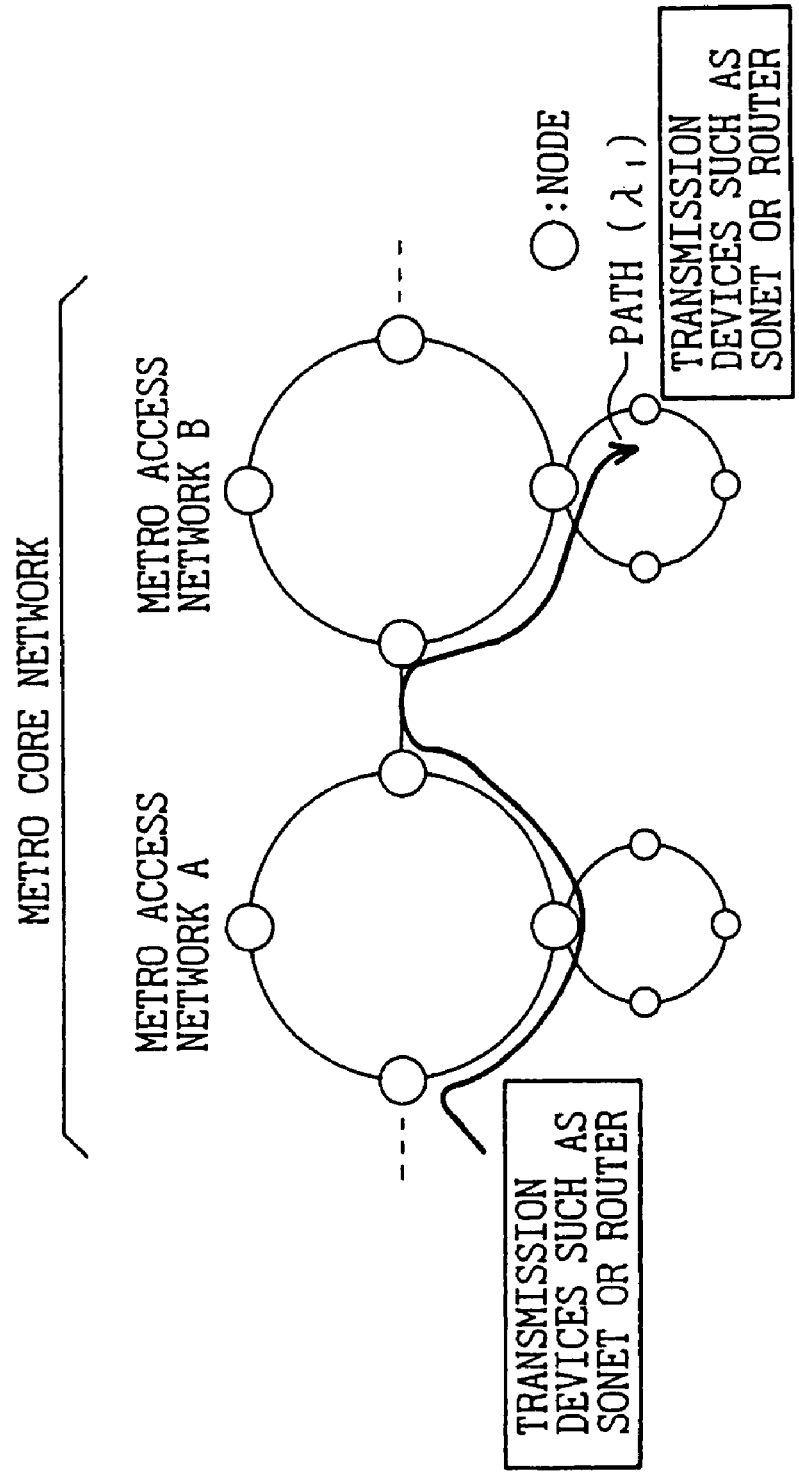

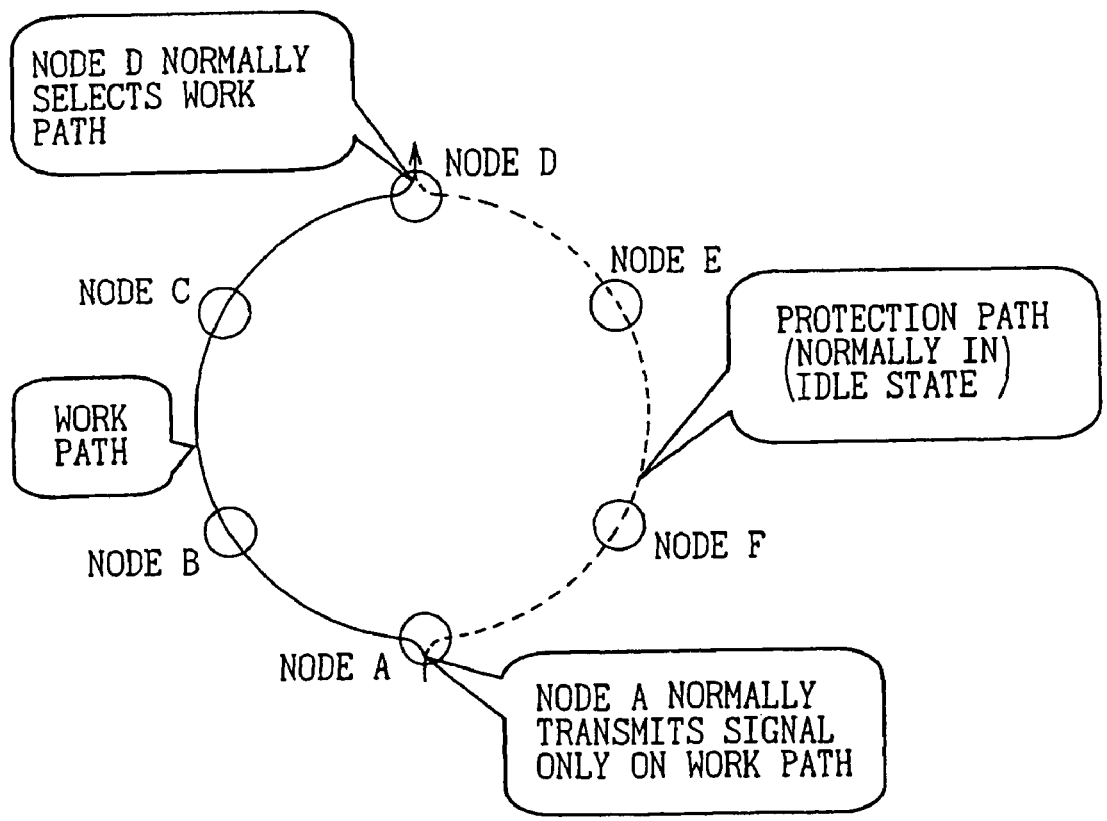

BEFORE PROTECTION

AT THE TIME OF PROTECTION

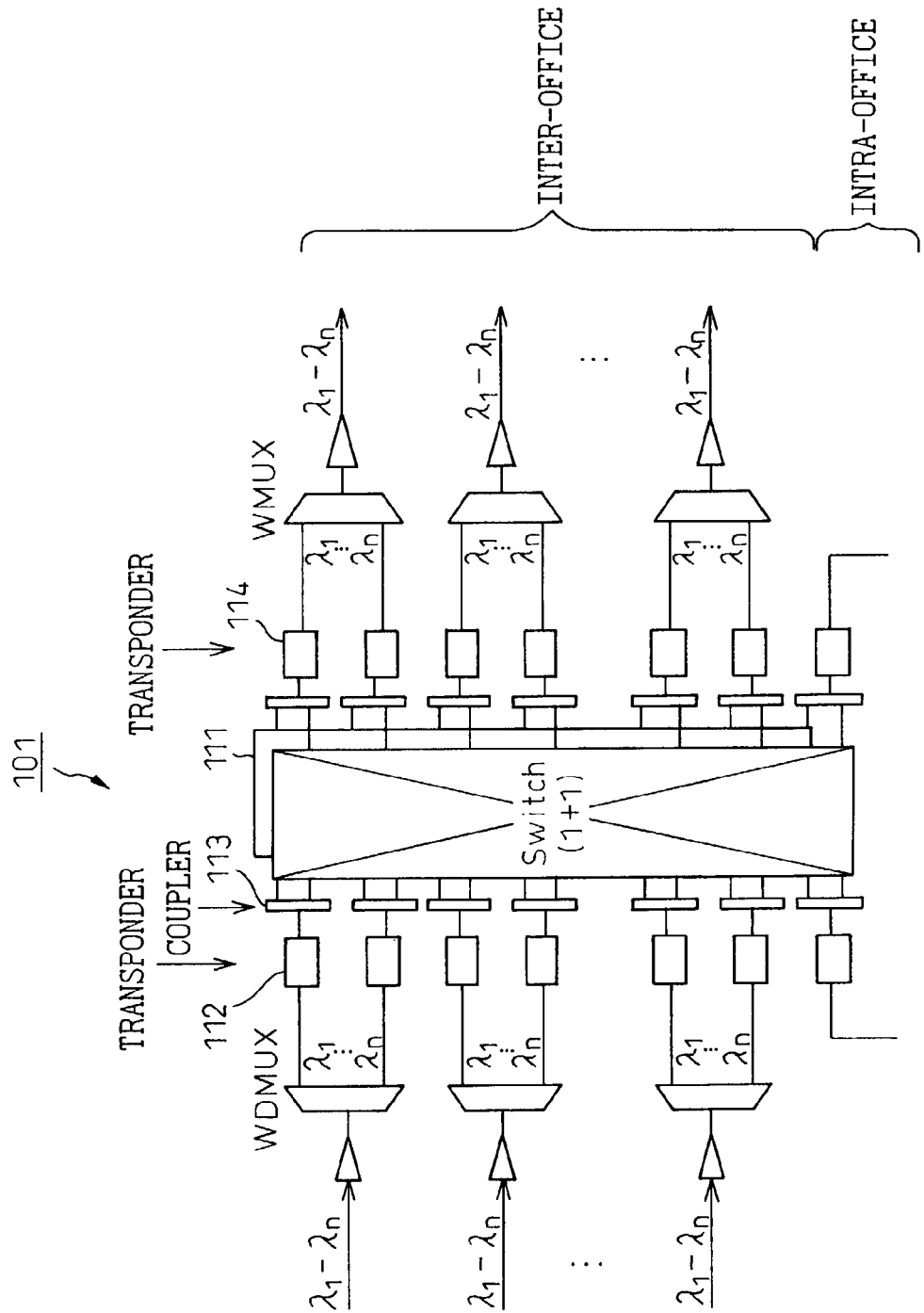

OPTICAL COMMUNICATION NODE AND OPTICAL NETWORK SYSTEM

BACKGROUND OF THE INVENTION

1. Field of the Invention

The present invention relates to an optical communication node and an optical network and, in particular, it relates to prevention of erroneous connection of optical communication nodes and optical networks having route switching functions in a wavelength division multiplex (WDM) network system.

2. Description of the Related Art

In recent years, as communication on the Internet, image transmission and the like becomes widespread, an WDM system that is suitable for large capacity and high speed data transmission using optical signals has been introduced. First, the WDM system has been introduced to long distance networks where the WDM system had much economic merit. At present, as its installation cost has been reduced due to the maturity of the technology, the WDM system is being introduced also in intracity core rings.

FIG. 1 shows an example of a metro ring network.

Conventionally, intra-company LANs between buildings and a metro-oriented system between suburb systems have been oriented to a ring network. As shown in FIG. 1, a metro domain is divided into one domain that is comprised of metro access networks A and B close to the subscriber side, such as inter-building connection in urban districts, and the other domain that is comprised of a metro core network (that is also referred to as a metro interoffice, or a metro IOF) that interconnects the metro access networks in the urban districts or is connected to a long distance network.

Today, WDM is applied also to the metro access network, wherein a passive OADM (optical add drop multiplexing) method is the mainstream method.

FIGS. 2A and 2B show an example of the metro access network using the passive OADM method. FIG. 2A shows an example of a two fiber ring network that is comprised of 4 nodes A-D, while FIG. 2B shows an example of a one-way intra-device configuration in each of the nodes A-D.

In FIG. 2B, among WDM signals of 32 wavelengths ($\lambda_1$-$\lambda_{32}$) that are transmitted on a fiber 10 in any one direction, a band signal having wavelengths $\lambda_1$-$\lambda_3$ is dropped by a fixed wavelength filter 11 such as a dielectric multilayer filter, and then demultiplexed into light signals of each wavelength $\lambda_1$-$\lambda_3$ by an optical branching filter 12 at the next stage. After undergoing processes such as optical amplification and wavelength conversion by corresponding transponders 13-15, each wavelength signal $\lambda_1$-$\lambda_3$ is output to an external network device such as a router installed in the node.

On the other hand, a signal that is input from the external network is converted into wavelength signals $\lambda_4$-$\lambda_6$ by the corresponding transponders 23-25, respectively. These are multiplexed into a signal of wavelengths $\lambda_4$-$\lambda_6$ by an multiplexer 22 and then added to the WDM signal of 32 wavelengths ($\lambda_1$-$\lambda_{32}$) transmitted on the fiber 10 via a fixed wave length filter 21.

As described above, according to the passive OADM method, any light signal of a particular wavelength or wavelength group can be readily added to or dropped from the WDM signal. However, since each node uses dedicated parts such as the fixed wavelength filters 11 and 21 that are adjusted for the corresponding devices, a signal path route (the wavelength or wavelength group to be used) assigned for each node is fixed.

As a result, in network design according to the passive OADM method, it is necessary to determine transmission routes and transmission capacity in advance and dispose filters for the determined conditions. Further, when the transmission routes or the transmission capacity are changed after the service is started, it is necessary to disconnect the network and terminate the service, and then add filters that correspond to new conditions.

In the future, it is expected that optical WDM ring networks will be introduced into the metro core network that is located between the access networks and the long distance networks. As shown in FIG. 1, the metro core network is based on the ring configuration because of the ease of the protection technique and large-scale networks are constructed by connecting the ring configurations in a multistage manner. Also, the metro core network is connected to the rings of the metro access networks such as the passive OADM method as shown in FIG. 2A using unoccupied nodes, or is connected to the long distance networks.

In such a case, when data signals concentrated from the access networks are exchanged between the nodes, or line capacity is increased so as to connect to the long distance networks, for example, a technique for changing and switching line routes becomes important. It is expected that the paths (line routes) will be changed more frequently in the future and the switching will have to be performed automatically for the three reasons described below:

(1) As the network size and demand for the network is increased, the line route setting will be changed more frequently, (2) In order to provide IP over WDM, a protection feature will be provided at the side of the WDM system. In this case, due to bit-rate independence, it is necessary to perform wavelength switching in an optical layer and complete the switching within a short time (50-100 ms) corresponding to a SONET (Synchronous Optical Network) ring, and (3) In the future, as a wavelength time sharing service is provided, the line route will be switched more frequently. Also in this case, the switching must be completed within the short time mentioned above.

In consideration of the above facts, it is necessary to support features for flexibly accommodating disconnection of networks, suspension of service and the like due to the change of transmission routes or transmission capacity of the metro access networks and for performing switching of connection destinations remotely while preventing erroneous connection.

FIG. 3 schematically describes operation of a ring network having path protection features according to an OSPPR (Optical Shared Protection Path Ring) method.

In FIG. 3, one signal is transmitted on one fiber of a two fiber ring in a clockwise direction and the other signal is transmitted on the other fiber in a counterclockwise direction. Here, a group of wavelength signals transmitted on each fiber is divided into work signals and protection signals. For example, in the group of the wavelength signals in the clockwise direction, even wavelengths are assigned to the work signals and odd wavelengths are assigned to the protection signals. On the other hand, in the group of the wavelength signals in the counterclockwise direction, odd wavelengths are assigned to the work signals and even wavelengths are assigned to the protection signals.

In normal communication, a transmitting end node A transmits a signal to a receiving end node D on a work path $\lambda_x$ in the clockwise direction shown in a solid line in the figure by using the work signal. The receiving end node D receives the signal by selecting the work path. On the other hand, the corresponding protection path $\lambda_x$ in the counterclockwise direction, that is shown as a dotted line in the figure, is idle.

Here, if any line failure, such as a break of the line, occurs in the work path, the transmitting end node A switches the path to the side of the protection path to continue transmission of the signal. After that, the receiving end node D also switches the path to the side of the protection path to continue reception of the signal. Here, it is to be noted that the signal interrupted by the line failure and the like must be recovered within 50-100 ms by the protection action.

In this connection, so as to improve operational efficiency of such configuration, path sharing is typically implemented by providing a signal PCA (protection channel access) path having a lower priority appropriately on the route for protection. In this case, when the failure occurs at the work side, the PCA signal is stopped at the protection side and a protection signal having a higher priority is inserted.

The line route switching occurs frequently and not only when the failure of the line route occurs but also when the line is operated normally due to the wavelength time-sharing service and the like.

In the switching of the line route setting described above, a network management system must manage the switching procedure and the switching timing and provide instructions appropriately but, conventionally, as shown below, there have been problems in that the erroneous connection of the paths might occur when the line route setting was switched, or operation of the instruction system for preventing such erroneous connection might be delayed.

FIGS. 4A and 4B show an example of the erroneous connection that may occur at the time of protection operation.

FIG. 4A shows a normal communication condition. Here, a signal is transmitted in a counterclockwise direction from a transmitting end node D to a receiving end node B via a work path $\lambda_1$, and a PCA signal having a lower priority is transmitted in a clockwise direction from a transmitting end node A to a receiving end node C via its corresponding protection path $\lambda_1$.

FIG. 4B shows a case wherein a line failure such as a break of a fiber occurs in the work path $\lambda_1$ between the node C and the node D. In this case, the line route is switched to the protection route $\lambda_1$ by the protection operation. As a result, the signal from the transmitting end node D is transmitted to the receiving end node B through the node A in the clockwise direction. The relay node A terminates transmission of the own PCA signal and passes the signal from the transmitting end node D, and the receiving end node B switches the receiving route so as to receive the signal from the protection path $\lambda_1$.

In the case described above, relative switching timing of the line routes between the nodes A-D, or switching sequence of them will become a problem. When the switching is started from the receiving end node B, after the clockwise route is switched from the through mode to the drop mode at the node B and until the relay node A stops the transmission of the PCA signal and then is switched to the through mode, the PCA signal from the node A is erroneously connected to the receiving end node B and output to an external network.

On the contrary, when the switching is started from the transmitting end node D, the transmitting end node D first switches the line route to the clockwise direction. Then, after the relay node A stops the transmission of the PAC signal and then switches the route to the through mode and until the receiving end node B switches the route in the clockwise direction from the through mode to the drop mode, the signal from the transmitting end node D is erroneously connected to the node C that is the receiving end node of the PCA signal and output to the external network.

FIG. 5 shows an exemplary node configuration for describing the action of the erroneous connection mentioned above more specifically.

First, the node configuration in FIG. 5 will be described briefly. A WDM signal input from an optical fiber 31 in a clockwise route is amplified by an optical preamplifier 37, and then demultiplexed into each wavelength signal ($\lambda_1$-$\lambda_n$) to be output by an optical branching filter 38. Further, a portion of the input signal is input to an optical supervisory channel (OSC) 33 by an optical branching filter 32.

The optical supervisory channel 33 converts the input signal into an electric signal to give it to a processing/controlling section 34 at the next stage. The processing/controlling section 34 checks communication conditions of the optical fiber 31 in the clockwise route relying on the input signal and the like, and if there is any failure, performs switch control inside the node and the like. Further, a pilot signal and others to be given to the node at the next stage are output via an optical supervisory channel 35 and an optical multiplexing section 36 at the output side.

Next, there will be given a description of the switching action in the node, wherein a work signal $\lambda_1$ (w) in the clockwise direction that is demultiplexed by the optical branching filter 38 is input to a 2×2 switch 39. If the 2×2 optical switch 39 is set to an add/drop mode, it drops the input work signal $\lambda_1$ (w) and outputs it to an external network 59 via an optical coupler 45 at the next stage and transponders 47 and 48 in a redundant configuration.

On the other hand, a signal from the external network 59 is input via either one of transponders 51 or 52, which are configured redundantly, and a 1×2 optical switch 50 to the 2×2 switch 39, which, in turn, adds the signal and outputs it as one wave in a WDM signal to the optical fiber 31 via an optical attenuator 40, an optical multiplexer 41, an optical postamplifier 42 and an optical multiplexer 36 at the next stage.

Alternatively, if the 2×2 optical switch 39 is set to a through mode, it passes the input work signal $\lambda_1$ (w) and outputs it to the optical fiber 31 in the clockwise direction as one wave in the WDM signal via the optical attenuator 40, the optical multiplexer 41, the optical postamplifier 42 and the optical multiplexer 36 at the next stage. Its corresponding protection signal $\lambda_1$ (p), that is input from an optical fiber 43 in a counterclockwise route, is handled similarly by a 2×2 optical switch 44.

Here, in the lower central part of the figure, it is to be noted that there is also shown an interface with the external network 59 of a direct connection type wherein the 2×2 optical switch is connected to the external network 59 directly, in place of the one of a transponder type wherein an optical signal is once converted into an electric signal and then converted into a predetermined optical signal. In this case, a WDM optical transmitter/receiver is incorporated into network devices out of the ring.

Next, based on the premise of the node configuration described above, the process of the erroneous connection shown in FIG. 4B will be described more specifically. As a result of the line failure occurring between the node C and the node D, if the receiving end node B switches the setting of the 2×2 optical switch 44 from the through mode to the add/drop mode to turn on an optical coupler 46, during the time when the relay node A switches the 2×2 optical switch 44 from the add/drop mode to the through mode, the PCA signal from the node A is output to the external network 59 of the node B.

On the other hand, if the transmitting end node D sets the 2×2 optical switch 44 to the add/drop mode and turns on the 1×2 optical switch 49 to start transmission in the clockwise line route, and then the relay node A switches the 2×2 optical switch 44 from the add/drop mode to the through mode, during the time when the receiving end node B switches the 2×2 optical switch 44 from the through mode to the add/drop mode, the signal from the node D is output to the external network 59 of the node C.

Further, if each node is instructed on switching procedures from the network management side in order to prevent the erroneous connection described above, there is a problem in that a load at the network management side may become excessively large and the time that is necessary for switching the line route in the entire node may be prolonged.

SUMMARY OF THE INVENTION

Therefore, in view of the above problem, it is an object of the present invention to provide a WDM ring network system that can prevent erroneous connection from a drop path of a node to an external network at the time of switching of a line route.

Further, it is another object of the present invention to provide a WDM ring network system that enables quick control and direction of network management in path switching and satisfies communication quality required for the ring network system that becomes increasingly large-scale.

In the large-scale WDM ring network system such as a metro core ring network, it enables support of prevention of the erroneous connection at the time of line route switching, and features for protection and for switching connection destinations remotely in connection with wavelength time sharing service that have been supported by a conventional SONET ring.

According to the present invention, there is provided an optical communication node that is connected to a specific optical path in an optical network, said optical communication node having: an external network that is placed thereunder; and an interruption means for interrupting connection between said optical network and said external network, wherein said interruption means interrupts the connection till a sequence of changing a route is completed when the route setting of said optical path is changed.

Said interruption means further interrupts the connection or releases the interruption in response to instructions from other optical communication nodes. Said optical communication node may further have an adding means for adding a receiving end node identifier to a transmitted signal, and a detecting means for detecting said receiving end node identifier included in a received signal, wherein said detecting means releases the interruption by said interruption means when said detecting means detects said receiving end node identifier of its own node.

Said optical communication node may further have a dummy signal means for generating and outputting a dummy signal, wherein said dummy signal means sends the dummy signal to said optical path and/or said external network to which signal transmission is stopped by said interruption means.

Still further, according to the present invention, there is provided an optical network system that interrupts at least one signal either from an external optical network to the input side of said optical network or from said optical network to the output side of the external optical network till a sequence of changing a route is completed when the route setting of an optical path is changed.

BRIEF DESCRIPTION OF THE DRAWINGS

The present invention will be more clearly understood from the description as set forth below with reference to the accompanying drawings.

FIG. 1 is a diagram showing an example of a metro ring network;

FIG. 3 is a diagram for schematically describing operation of a ring network having path protection features according to a BPSR method;

FIG. 24 is a diagram showing an exemplary configuration of the optical cross connect device.

DESCRIPTION OF THE PREFERRED EMBODIMENTS

Figure 6:
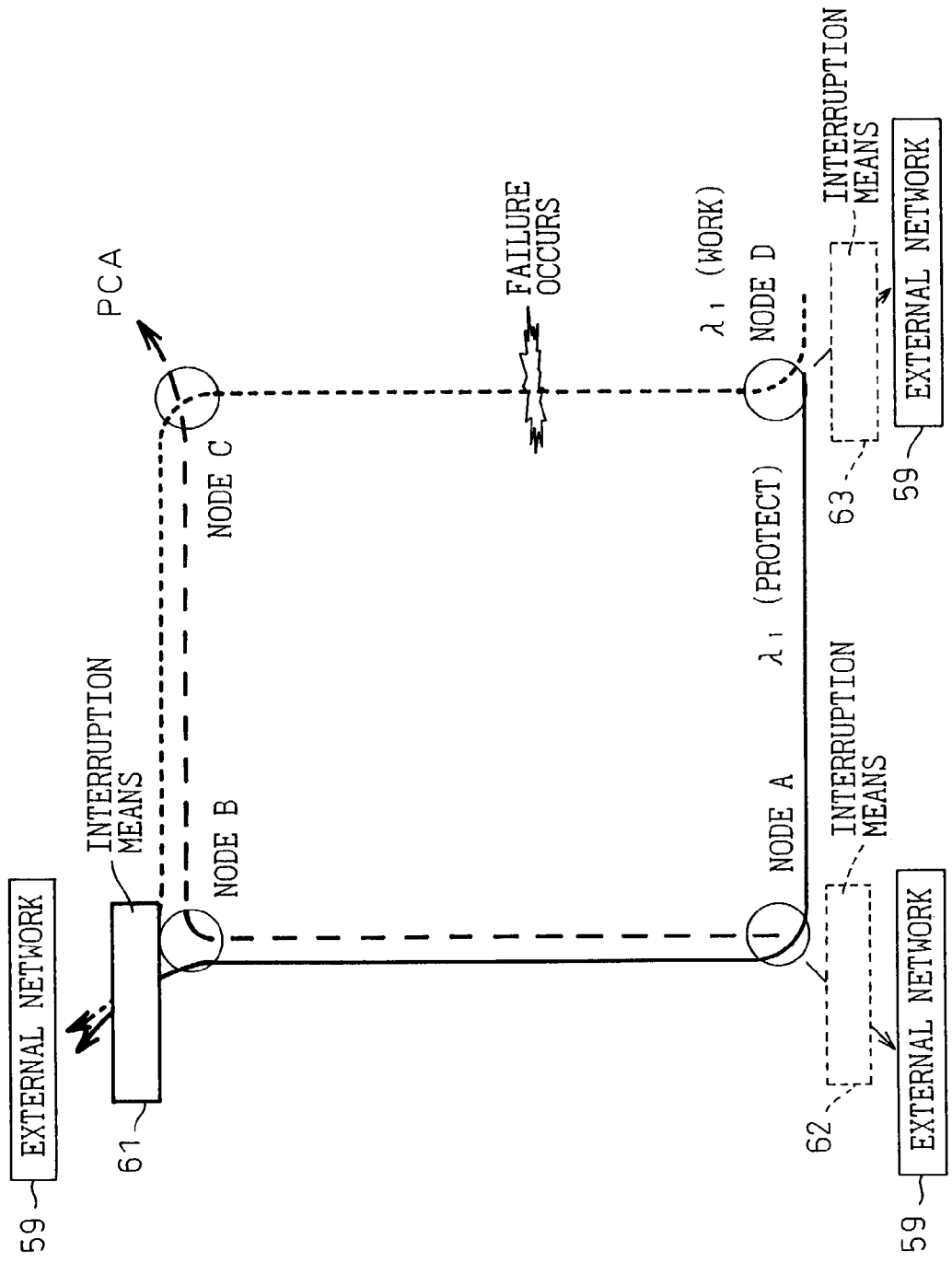
FIG. 6 shows a first embodiment of the present invention.

FIG. 6 shows a first embodiment of the present invention.

In FIG. 6, each of the nodes D, A and B on a line route that is switched when any failure occurs is provided with each of the interruption means 63, 62 and 61 for preventing a signal from being output to the outside, respectively.

Figure 7:
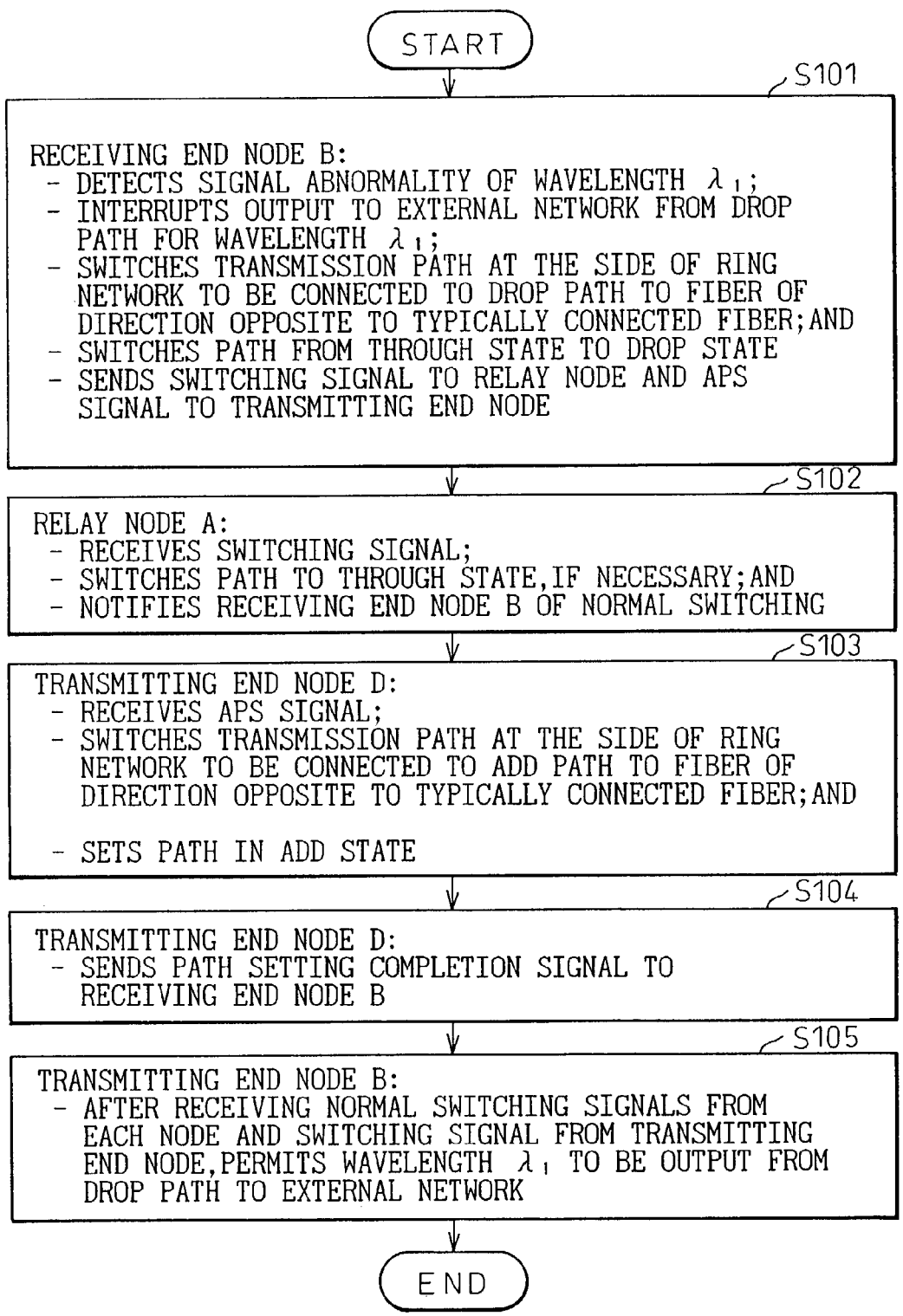
FIG. 7 is a diagram showing an exemplary line switching sequence in the first embodiment of the present invention.

FIG. 7 shows an exemplary line switching sequence in the first embodiment of the present invention. In this example, the line switching sequence is started from the receiving end node B at the downstream side that detects a failure first.

In step S101 of FIG. 7, when the receiving end node B detects an abnormality of a work signal $\lambda_1$ (w), the interruption means 61 interrupts the work signal $\lambda_1$ (w) as well as its corresponding protection signal $\lambda_1$ (p) output from each drop path to an external network 59. In this case, the node B either outputs a dummy signal such as an AIS (alarm indication signal) to the external network 59, or outputs no signal.

Then, the line route is switched from the work side to the protection side to switch intra-device paths from a through mode to an add/drop mode. It prevents erroneous connection to the node C in subsequent processes. Then, a switching signal is transmitted to each upstream relay node residing on the line route at the protection side (the node A in this example), and an APS (auto protection switching) that is a switching control signal is transmitted to the transmitting end node D. Here, an optical supervisory channel (OSC) is used for transferring signals for path switching between the nodes.

In step S102, according to the switching signal received by each relay node, the intra-device paths are switched, if necessary. At this time, the node A interrupts connection with the external network 59 temporarily by means of the interruption means 62 so as to avoid signal leakage when the intra-device path is switched. In this example, the relay node A switches the clockwise route from the add/drop mode to the through mode. Further, it notifies the transmitting source node B of such switching.

In step S103, when the transmitting end node D receives the APS signal, the node D interrupts connection with the external network 59 temporarily by using the interruption means 63 so as to avoid leakage when the intra-device path is switched. Then, the signal transmission route is switched from the counterclockwise route at the work side to the clockwise route at the protection side. Then, the clockwise route is set to the add/drop mode.

In step S104, the transmitting end node D notifies the receiving end node B of completion of the path setting. In step S105, after the receiving end node B confirms receipt of a normal switching signal from each relay node (the relay node A in this example) and a path setting completion signal from the transmitting end node D, said interruption means 61 is released so as to permit the protection signal of a wavelength $\lambda_1$ (p) to be output from the drop path to the external network 59. As described above, the interruption means 61 in the receiving end node B plays an important role in preventing the erroneous connection in this example.

Figure 8:
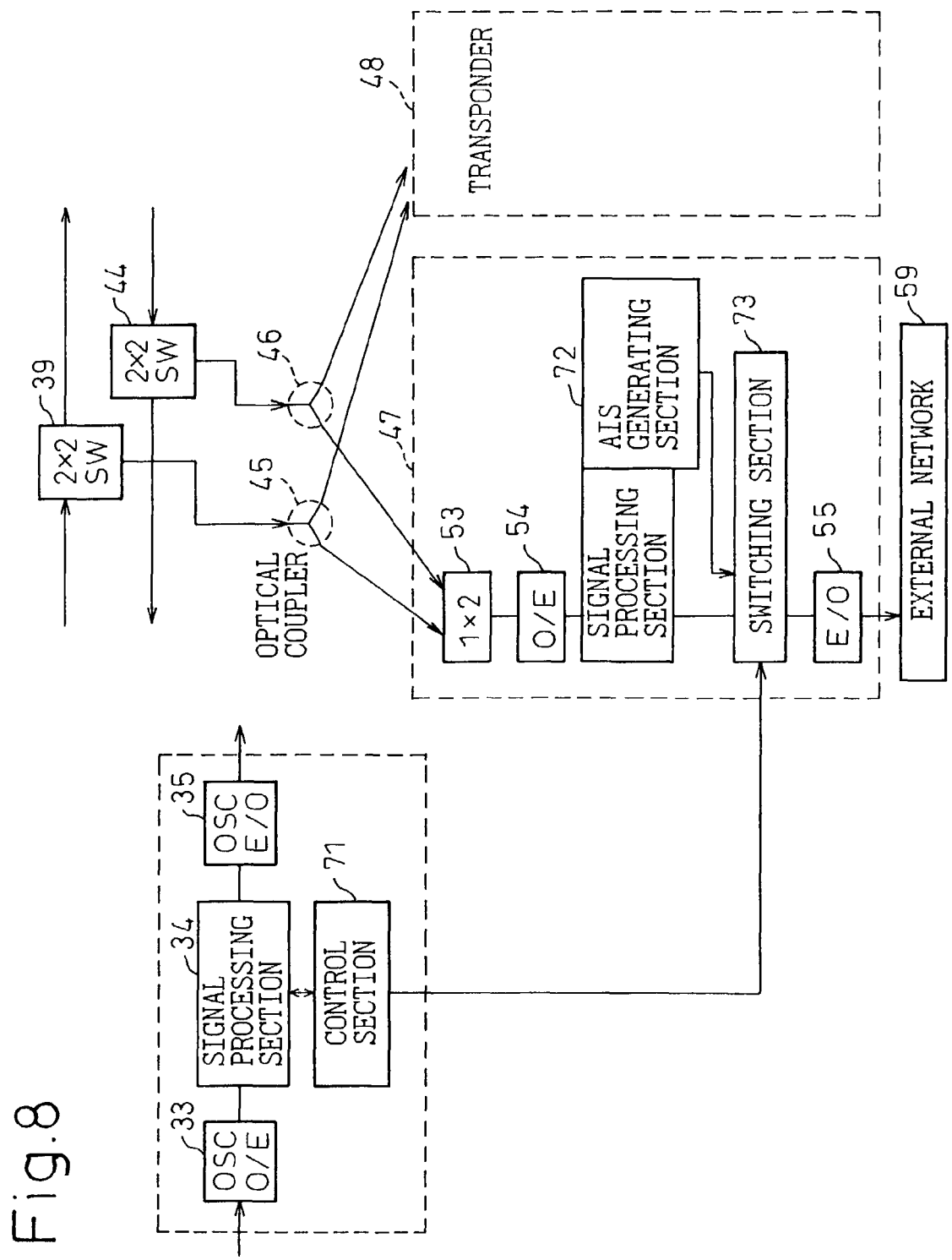
FIG. 8 is a diagram showing an example of a specific circuit configuration (1) in the first embodiment.

FIG. 8 shows an example of a specific circuit configuration (1) in the first embodiment.

In FIG. 8, in a supervisory control section for optical signals, in addition to an optical supervisory channel 33 at the input side, a processing/controlling section 34, and an optical supervisory channel 35 that are similar to the ones in the conventional case, a control section 71 is provided newly for controlling the interruption means of the present invention based upon the switching control signal through the supervisory signal from the upstream supervisory control section.

Further, in each of transponders 47 and 48 at the drop side, an AIS generating section 72 and a switching section 73 that constitutes the interruption means of the present invention are newly provided. The AIS generating section 72 generates a dummy signal that consists of an alternating pattern of "1" and "0" values, and the switching section 73 selects a signal from either the conventional signal processing section or the AIS generating section 72 and outputs it to the external network 59. Here, when the switching section 73 selects the side of the AIS generating section 72, the connection to the external network 59 is interrupted.

With reference to the operation of the first embodiment, when a failure occurs in the counterclockwise line route, the signal processing section 34 detects the failure and the control section 71 controls the switching section 73 to select the side of the AIS generating section 72. Then, due to control by a 1×2 optical switch 53, a signal that is dropped from a 2×2 optical switch 44 at the work side is switched to a signal that is dropped from a 2×2 optical switch 39 at the protection side.

Figure 9:
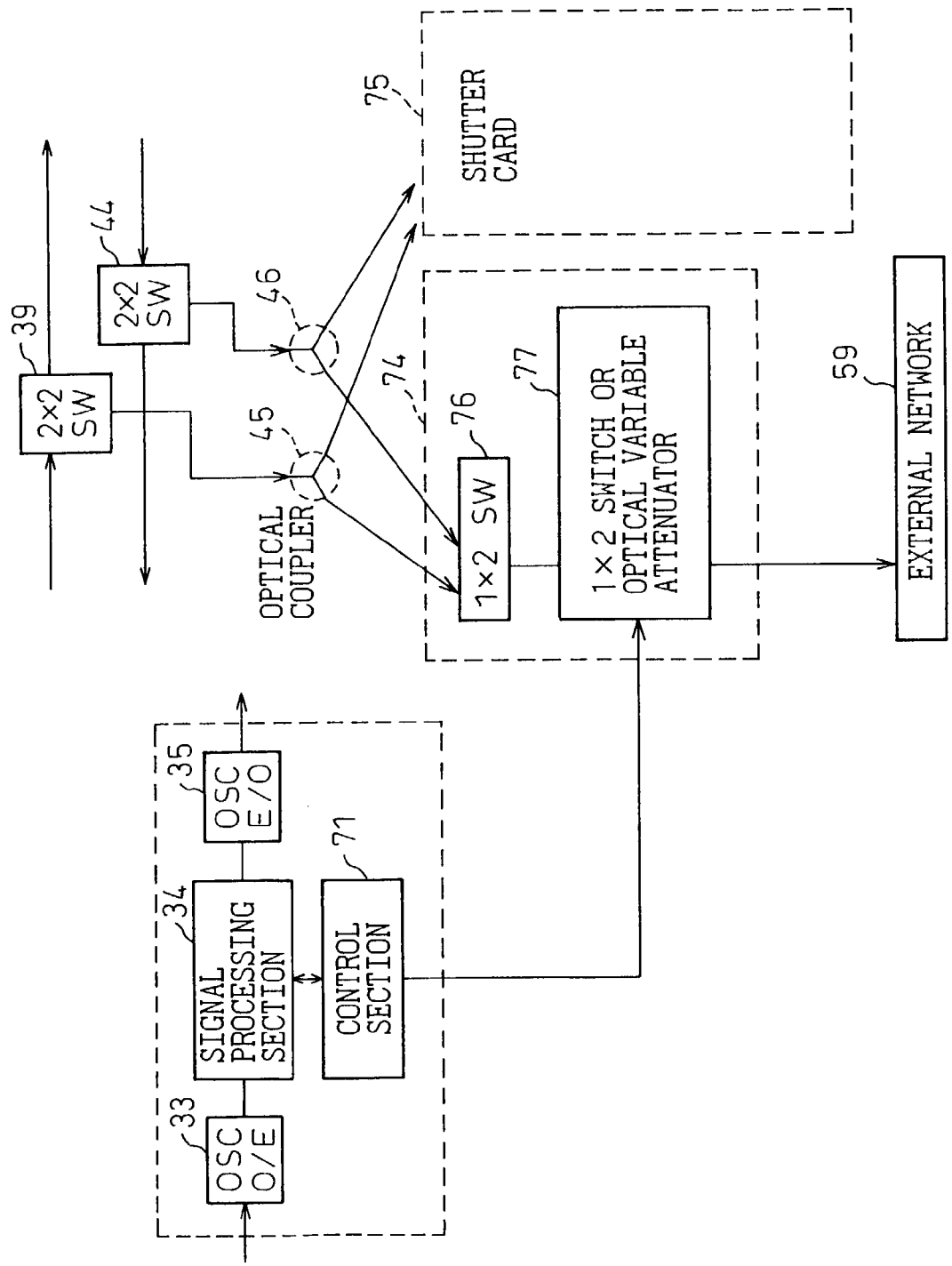
FIG. 9 is a diagram showing an example of another circuit configuration (2) in the first embodiment.

FIG. 9 shows an example of another circuit configuration (2) in the first embodiment.

Figure 2B:
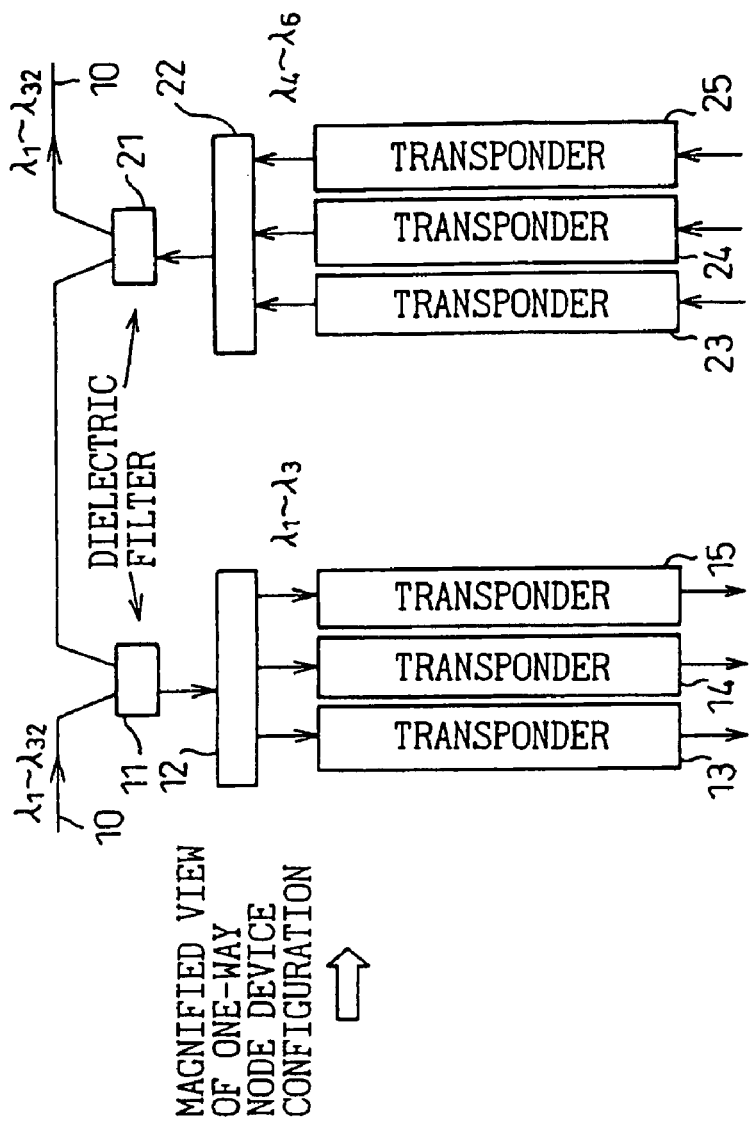
FIG. 2B is a diagram showing an example of a one-way intra-device configuration in each of the nodes A-D shown in FIG. 2.
Figure 2A:
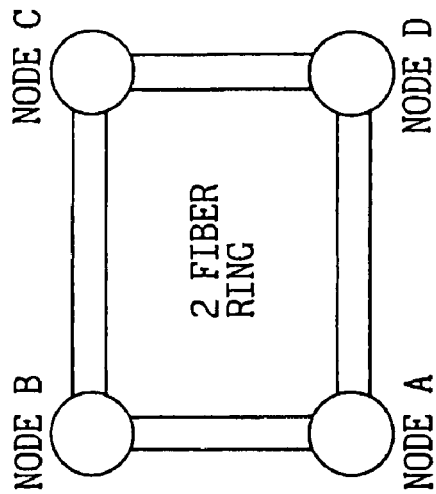
FIG. 2A is a diagram showing an example of a metro access network that is comprised of 4 nodes A-D according to a passive OADM method.
Figure 4A:
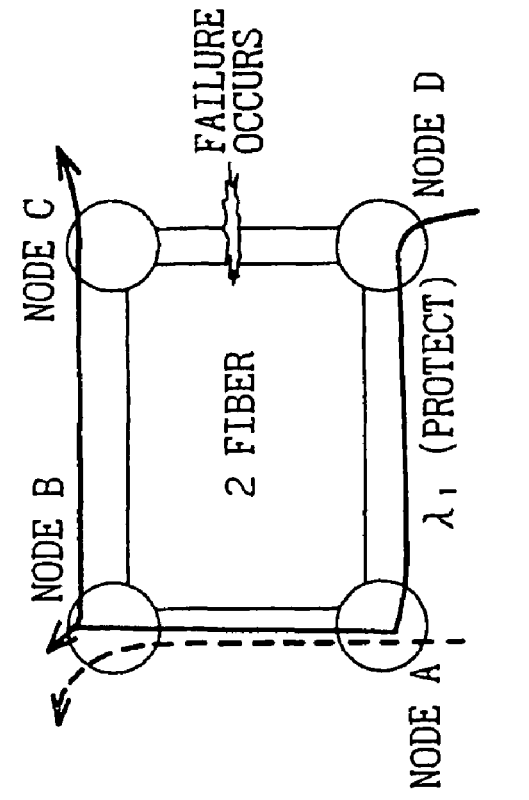
FIG. 4A is a diagram showing an example of a state before erroneous connection occurs at the time of protection switching.
Figure 4B:
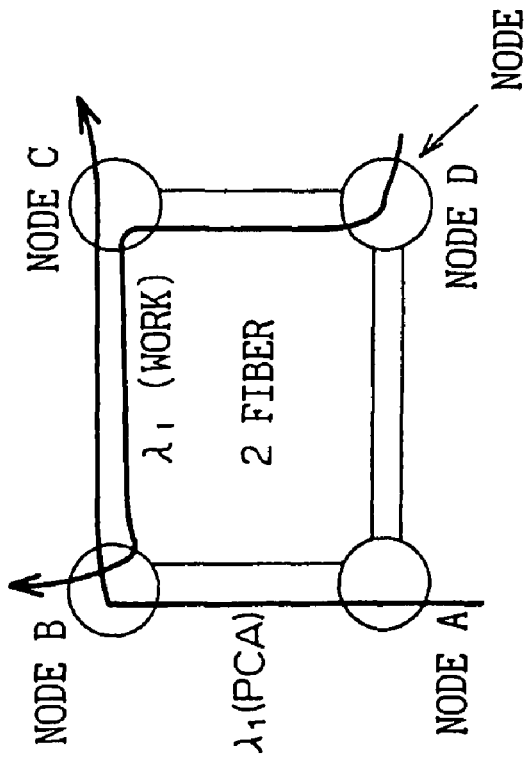
FIG. 4B is a diagram showing an example of a state after the erroneous connection occurs at the time of the protection switching.
Figure 5:
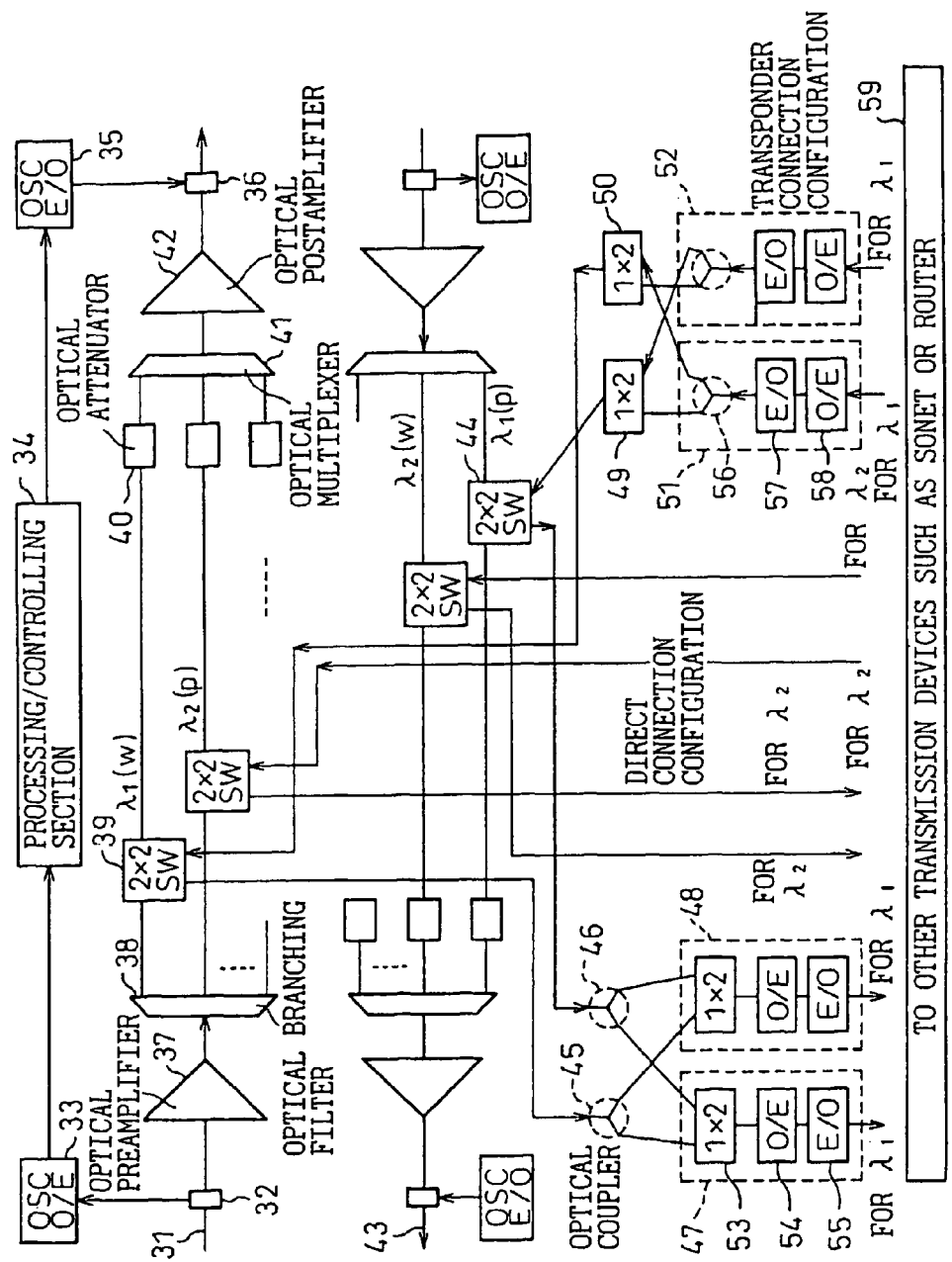
FIG. 5 is a diagram showing an exemplary ring node configuration.

In FIG. 9, instead of the transponders including the AIS generating sections 72 and the switching sections 73 shown in FIG. 8, simple shutter cards 74 and 75 only for controlling passage/interruption of optical signals are used. Since the shutter cards are used in this example, the present invention can also be applied to the direct connection configuration shown in FIG. 5.

A 1×2 optical switch or an optical attenuator section 77 in the shutter card 74 interrupts a signal to the external network 59 in response to an instruction from the controlling section 71. Further, by connecting a transmitter for generating an AIS signal to one side of the 1×2 optical switch 77, a dummy signal may be output to the external network 59 at the time of interruption. The first embodiment operates similarly to the case shown in FIG. 8.

Figure 10:
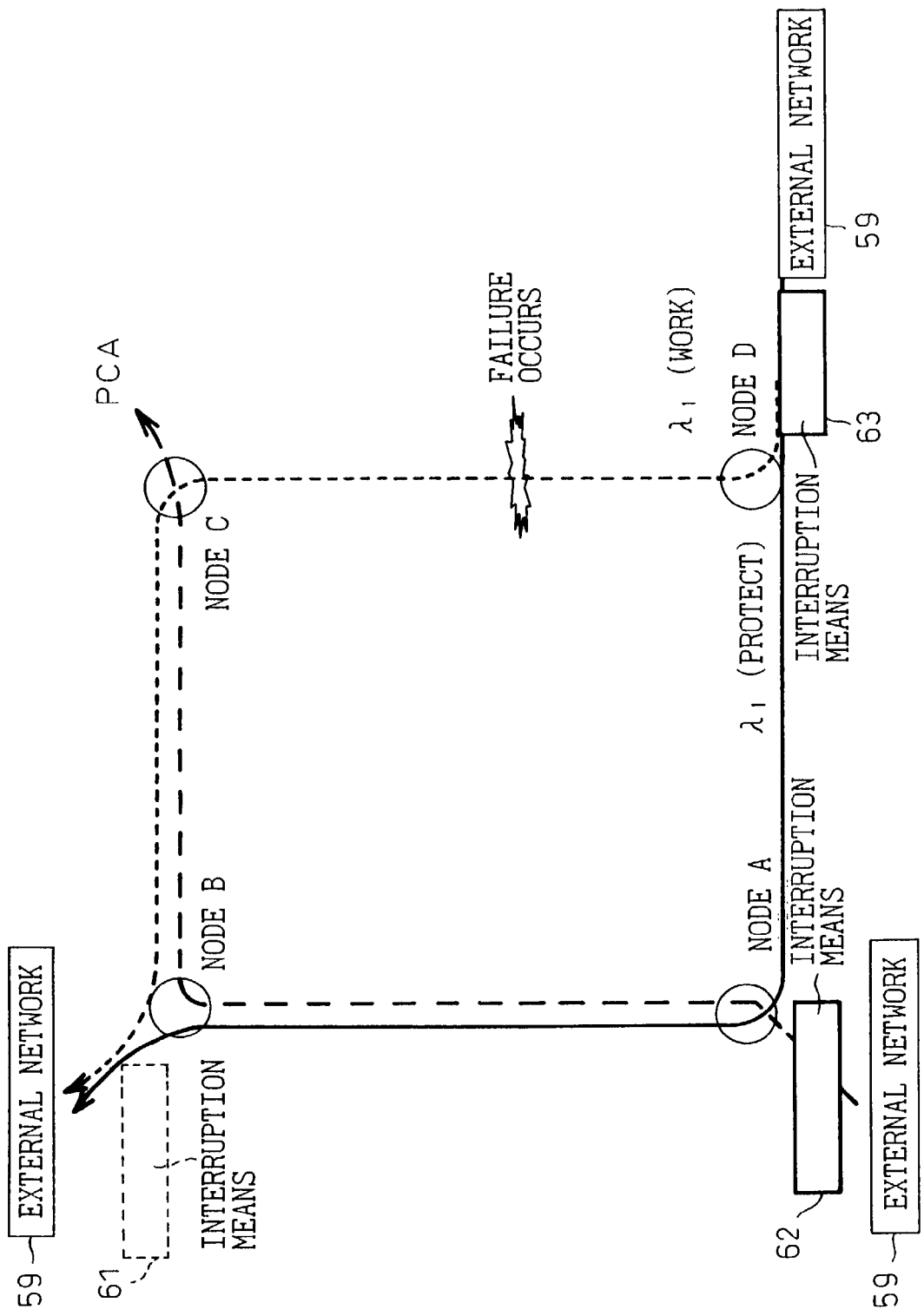
FIG. 10 is a diagram showing a second embodiment of the present invention.

FIG. 10 shows a second embodiment of the present invention.

Figure 11:
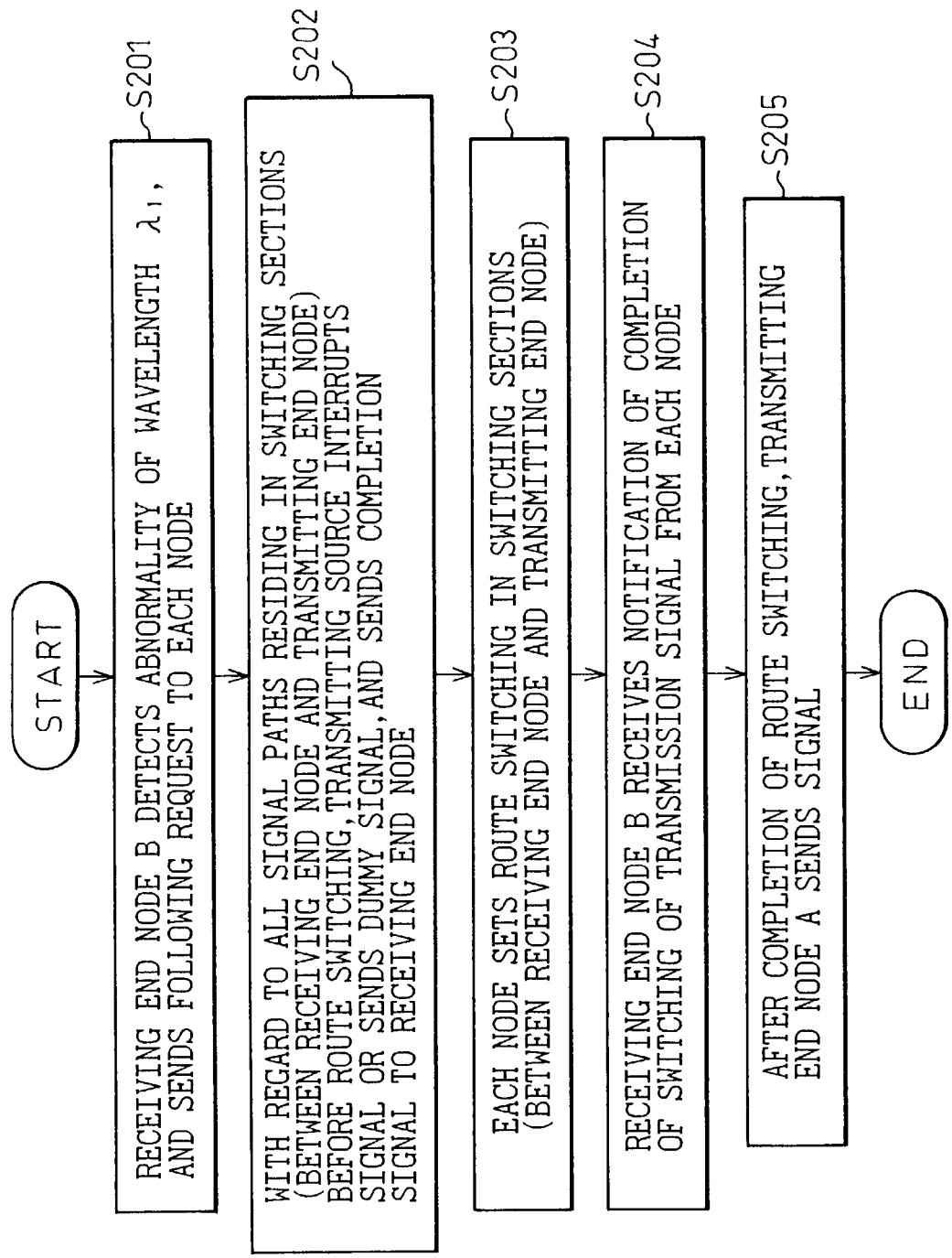
FIG. 11 is a diagram showing an exemplary line switching sequence in the second embodiment of the present invention.

FIG. 11 shows an exemplary line switching sequence in the second embodiment of the present invention. In this example, until a predetermined route setting is completed, a transmitting end node suspends output of a signal, that passes through the route switching section and has a wavelength, to be switched.

In step S201 in FIG. 11, when a receiving end node B detects abnormality of a work signal $\lambda_1$ (w), an interruption means 61 interrupts the work signal λ1 (w) as well as its corresponding protection signal λ1 (p) output from each drop path to an external network 59. In this case, the node B outputs a dummy signal such as an AIS signal to the external network 59.

Here, it is to be noted that it is not absolutely necessary that the interruption means 61 interrupts the signal λ1 to the external network 59 in this example. Then, a request to stop transmission is sent to the transmitting end node of the signal to be dropped at the node B, and to the transmitting end node of the signal passing through the node B. In this example, the request to stop the transmission is sent to the transmitting end nodes D and A. An optical supervisory channel (OSC) is used for transferring control signals between the nodes.

In step S202, the transmitting end node D, and the relay node A that is disposed between the receiving end node B and the transmitting end node D and sends an PCA signal, receive said request to stop the transmission. The nodes D and A either interrupt the light transmitted from themselves by means of the respective interruption means 63 and 62, or transmit the dummy signal instead. Then, the nodes D and A notify the receiving end node B of completion of the process to stop the transmission.

Further, though not shown in FIG. 10, when the nodes D and A further have another transmitting end node that transmits a signal to be dropped, in or passing through the nodes D and A themselves, the nodes D and A send a request to stop the transmission to the another node and receive notification of completion of the process to stop the transmission following the procedure similar to the method described above. In this case, after the nodes D and A receive the notification of completion of the process to stop the transmission from another node, the receiving end node B is notified of completion of the process to stop the transmission in said nodes D and A.

In step S203, the receiving end node B, which has received the notification of completion of the process to stop the transmission from the relay node A and the transmitting end node D, performs route switching in itself, and at the same time, instructs the nodes A and D to switch the route sequentially. In this example, as each of the nodes A, B and D performs route switching on the line route where there is no transmission signal or dummy signal, erroneous connection does not occur at the time of the route switching, as a matter of course.

In steps S204 and S205, the receiving end node B, which has received the notification of completion of the route switching from the relay node A and the transmitting end node D, releases the interruption means 61 in itself, and at the same time, notifies the nodes A and D of release of the request to stop the transmission. As a result, the interruption means 63 and 62 are released and the transmitting end node D starts signal transmission. As described above, the interruption means 63 and 62 in the transmitting end nodes D and A play an important role in preventing the erroneous connection in this example.

Figure 12:
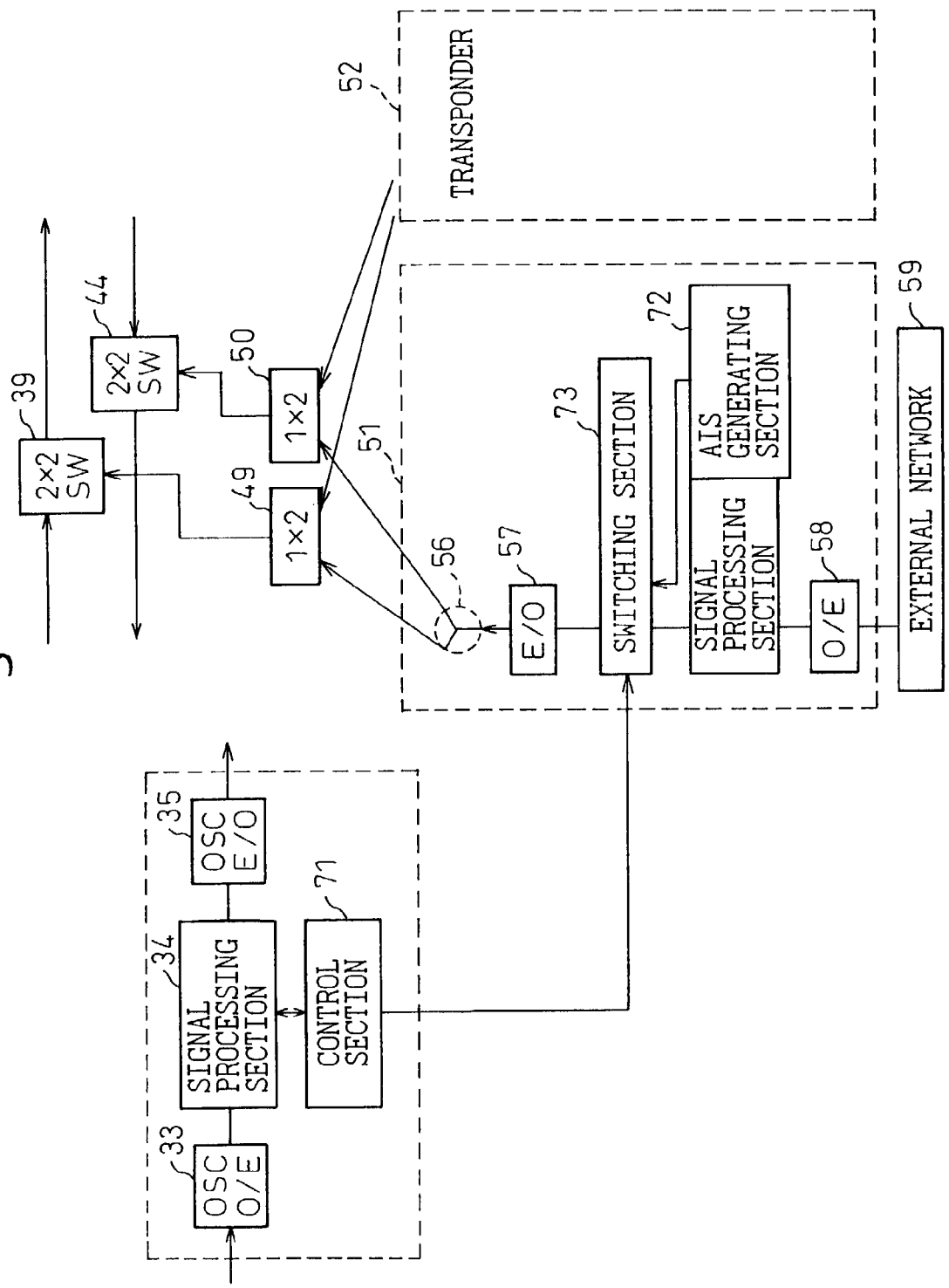
FIG. 12 is a diagram showing an example of a specific circuit configuration (1) in the second embodiment.

FIG. 12 shows an example of a specific circuit configuration (1) in the second embodiment.

In FIG. 12, a supervisory control section for optical signals is configured similarly to the ones in FIGS. 8 and 9. In this embodiment, in each of transponders 50 and 52 at the add side, an AIS generating section 72 and a switching section 73 that constitutes the interruption means of the present invention are newly provided. Further, the switching section 73 outputs an add signal that selects either a signal processing section or the AIS generating section 72. Here, if the switching section 73 selects the AIS generating section 72, it comes in the interrupted state.

With reference to the operation of the second embodiment, when a failure occurs in the counterclockwise line route, the signal processing section 34 in the receiving end node B detects it and sends an APS signal to the transmitting end node D. The signal processing section 34 in the transmitting end node D, in turn, detects it and the control section 71 controls the switching section 73 to allow the AIS generating section 72 to output a dummy signal. Then, the 2×2 optical switch 39 at the protection side is switched to the add/drop mode and said dummy signal is input as an add signal.

Figure 13:
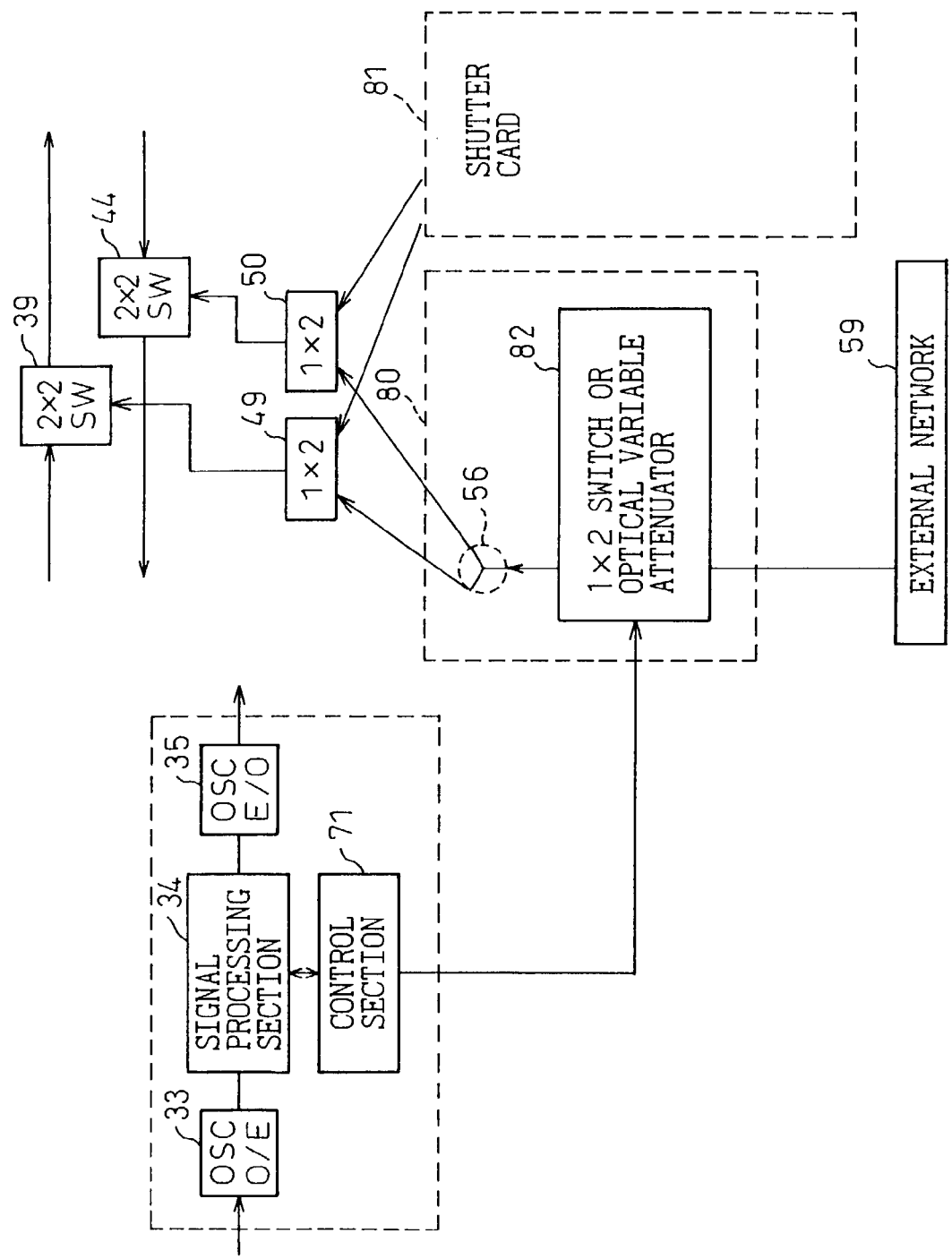
FIG. 13 is a diagram showing an example of another circuit configuration (2) in the second embodiment.

FIG. 13 shows an example of another circuit configuration (2) in the second embodiment.

Just as in the case of FIG. 9 described above, the configuration in FIG. 13 differs from the one in FIG. 12 only in that the transponders 50 and 52 at the add side are substituted by simple shutter cards 80 and 81 only for controlling passage/interruption of optical signals, wherein a 1×2 optical switch or an optical attenuator section 82 is also similar to the one in FIG. 9. As the shutter cards are used in this example, the present invention can also be applied to the direct connection configuration shown in FIG. 5, and this example operates similarly to the one shown in FIG. 12.

Figure 14:
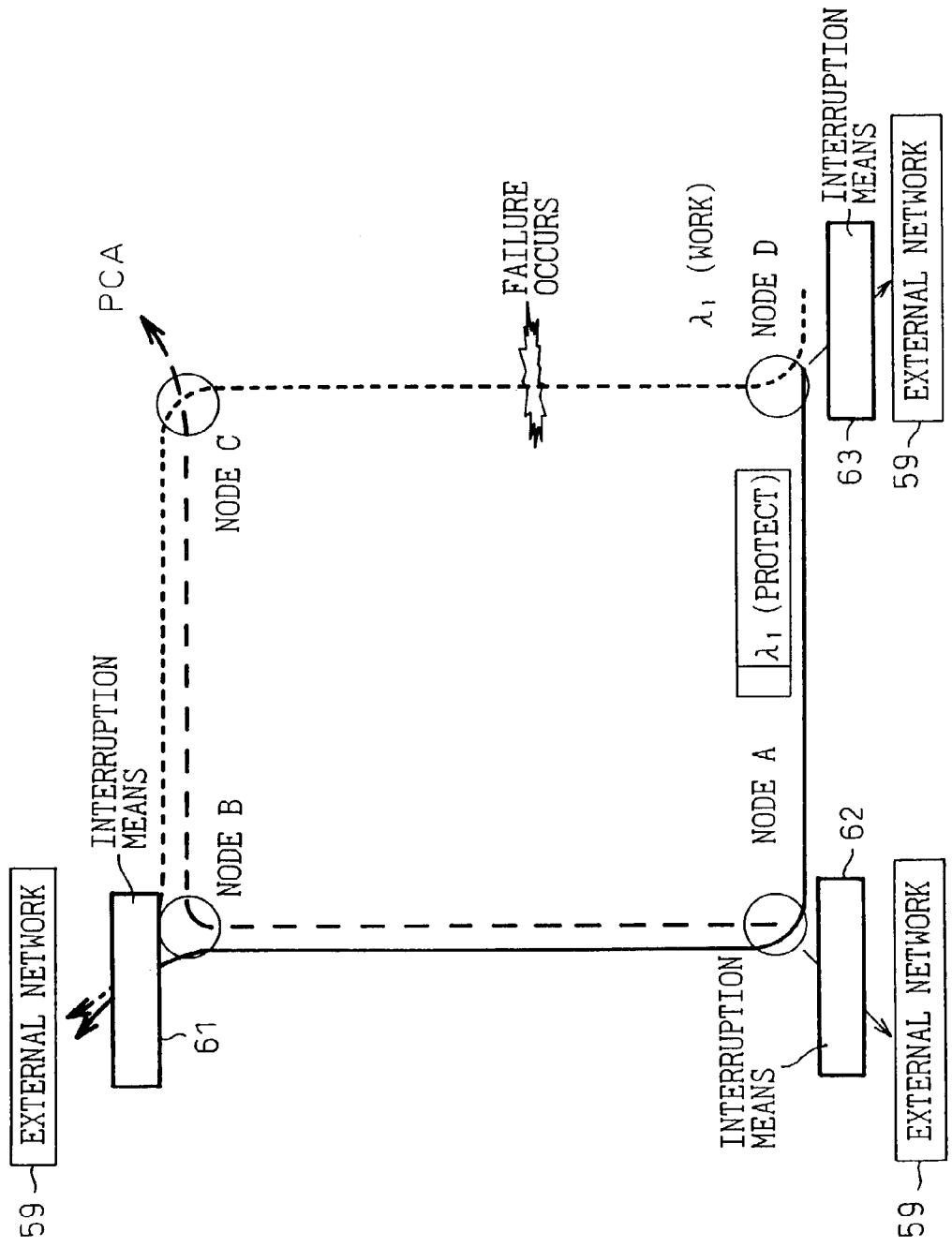
FIG. 14 is a diagram showing a third embodiment of the present invention.

FIG. 14 shows a third embodiment of the present invention.

In the first and second embodiments described above, the optical supervisory channel (OSC) is used for transferring signals for path switching, and each node transfers the control signals independently therebetween so as to control the interruption means 61-63 and path switches in each node. Therefore, though the problem of the erroneous connection is solved by the first and second embodiments, when the network scale becomes larger or paths across a plurality of ring networks are provided, the time for switching the line route is increased, which may result in degradation of communication quality.

In this embodiment, this problem is solved by configuring so that the control of interruption means 61-63 can be performed easily and quickly. For such purpose, an identifier is predetermined for each node and a transmitting end node transmits a signal with the identifier included in the transmitted signal. The receiving end node reads the identifier included in the received signal and, if the signal is destined for the receiving end node itself, the receiving end node releases the interruption means to connect the drop path to an external network 59. On the contrary, if the signal is not destined for the receiving end node itself, the receiving end node interrupts connection with the external network by means of the interruption means.

Figure 15:
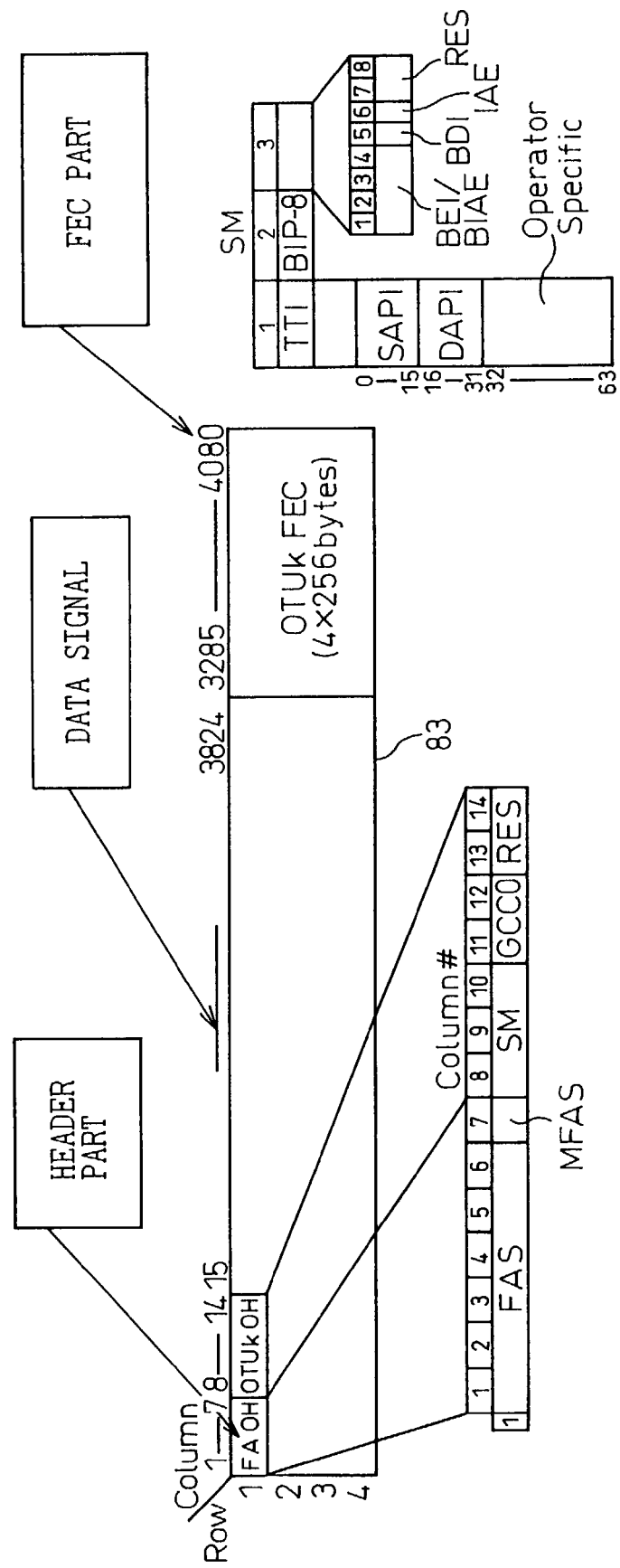
FIG. 15 is a diagram showing an exemplary signal format using digital wrapper technology.

FIG. 15 shows an exemplary signal format using digital wrapper technology. Here, an OTU (optical channel transport unit) k frame structure is used, wherein the receiving end identifier of the present invention is set in each of SAPI (source access point identifier) and DAPI (destination access point identifier) locations in a header part of the OTUk frame structure and a transmitted signal is inserted into its data signal part.

For example, when the transponders are used, the transponder at the transmitting side performs coding using the digital wrapper technology to set the identifier of the receiving end node in said header part. The transponder at the receiving side performs decoding accordingly and outputs the received signal if the signal is destined for the receiving end node itself. If the signal is destined for the other node, the receiving end node either interrupts the output or outputs a dummy signal to the external network.

Further, as an alternative method other than the digital wrapper, when the transponders are used in the transmitting end node and the receiving end node, a descrambling pattern that is provided for each receiving end node by the signal processing section may be assigned as a unique pattern and used as said receiving end node identifier. In this case, by associating the scrambling pattern that is provided by the signal processing section of the transmitting end node with the scrambling pattern of the receiving end node, a similar process can be performed in a way easier than said digital wrapper.

In this connection, when 2R transponders that do not perform retiming are used, or a WDM interface is provided at the side of network devices in the external network 59 to connect to the ring network directly without interposing the transponders (the direct connection configuration), the data signal itself cannot be manipulated such as by the digital wrapper technology described above and the like. In the present invention, in order to add receiving end identification information to the transmitted signal also in such case, a low speed pilot signal is superimposed on the main signal to be transmitted by amplitude modulation (AM), phase modulation (PSK) and the like.

Figure 16:
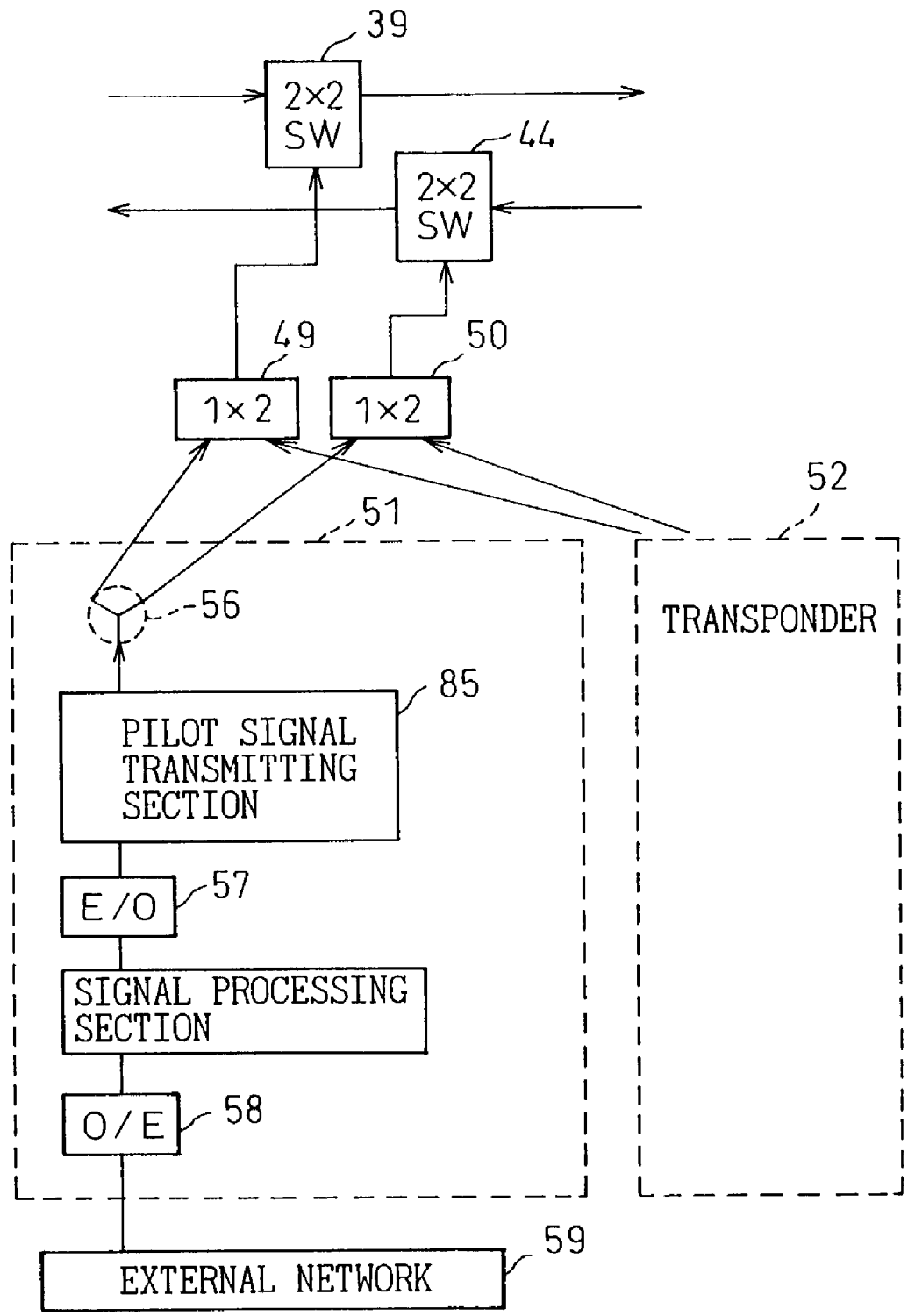
FIG. 16 is a diagram showing an example of a specific circuit configuration (1) at the side of a transmitting end node in the third embodiment.

FIG. 16 shows an example of a specific circuit configuration (1) at the side of a transmitting end node in the third embodiment.

According to this embodiment, in transponders 51 and 52 at the add side, a pilot signal transmitting section 85 is added to the conventional configuration. Instead of the digital wrapper signal shown in FIG. 15, the pilot signal transmitting section 85 adds the receiving end identification information to the transmitted signal as the low speed modulating signal (pilot signal) such as AM, PSK and the like so as to generate and transmit the modulated transmission signal. Here, it is to be noted that the supervisory control section for optical signals shown in the first and second embodiments are not shown since it is not concerned with the operation of this embodiment.

Figure 20:
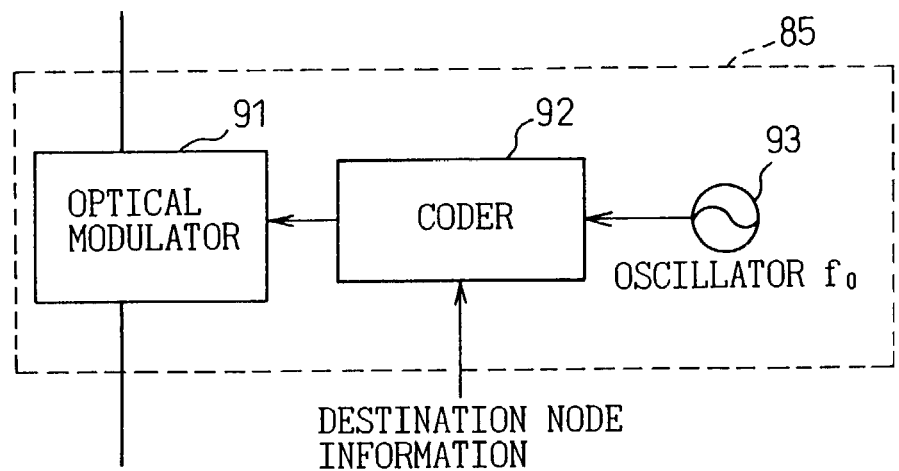
FIG. 20 is a diagram showing an exemplary configuration of a pilot transmitting section.

FIG. 20 shows an exemplary configuration of the pilot transmitting section. An amplitude modulation signal including the receiving end identification information is generated by a coder 92, to which the information about the destination node (receiving end node) is input, and a low speed ($f_0$) oscillator 93, and then superimposed on the transmission signal by an optical modulator 91. The optical modulator is selected according to the modulation method: for example, when an amplitude modulation signal is superimposed, a MZ interference type modulator or an optical attenuator is used. Further, the signal is passed through a plurality of rings, the pilot signal may be terminated once at a junction between the rings and another pilot signal that is assigned to the termination node of the next ring may be superimposed again.

With reference to the operation of the third embodiment, the transmitting end node D transmits a signal in which a pilot signal including identifier information of the receiving end node B is superimposed on a transmission signal from the external network 59. In this embodiment, said pilot signal is added to the 2×2 optical switch 39 via the 1×2 optical switch 49 and output to the clockwise line route.

Figure 17:
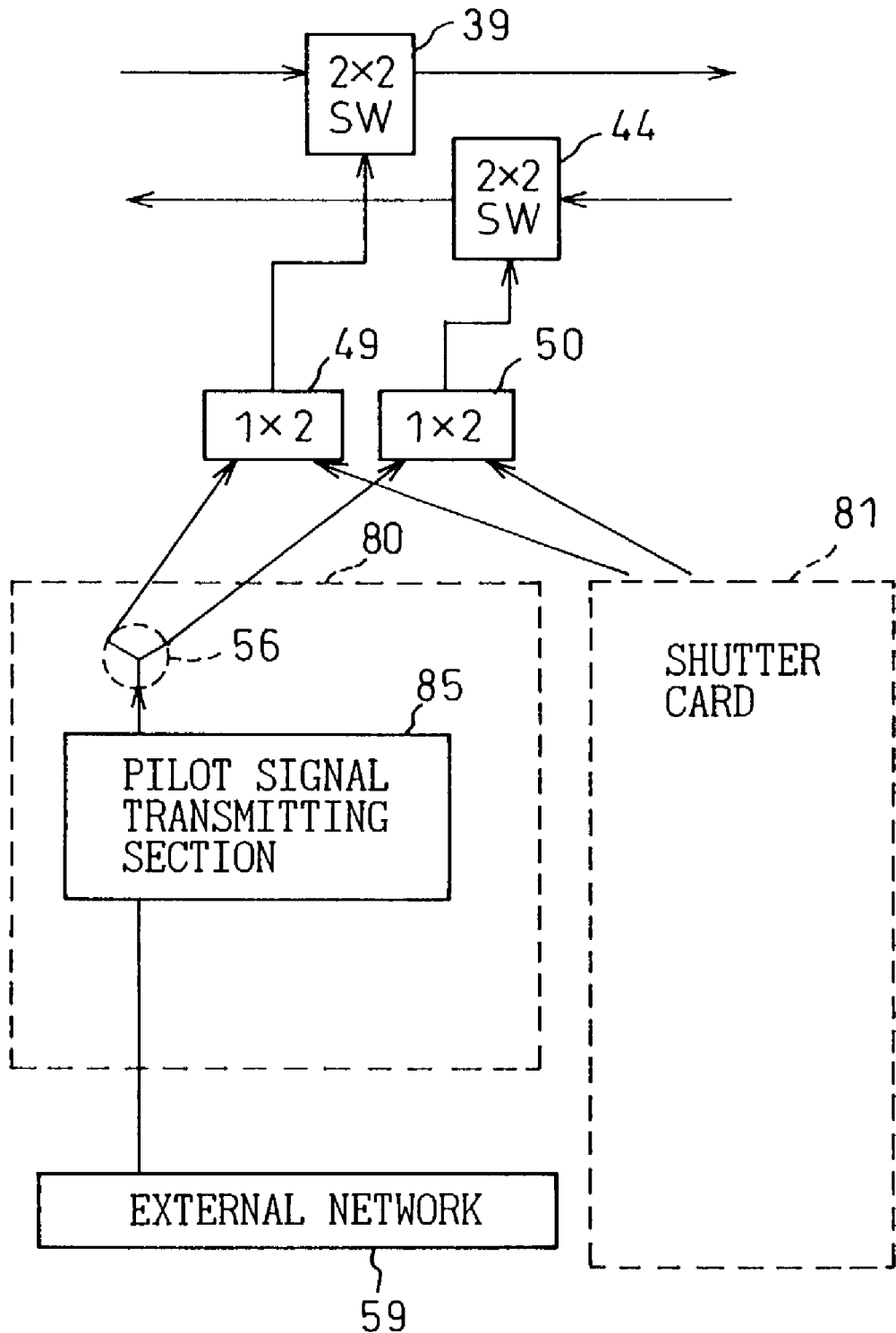
FIG. 17 is a diagram showing an example of another circuit configuration (2) at the side of the transmitting end node in the third embodiment.

FIG. 17 shows an example of another circuit configuration (2) at the side of the transmitting end node in the third embodiment.

In FIG. 17, shutter cards 80 and 81 are used instead of the transponders. The pilot signal transmitting section 85 is also provided here, which operates similarly to the case shown in FIG. 16. This embodiment is suitable for the direct connection configuration shown in FIG. 5.

Figure 18:
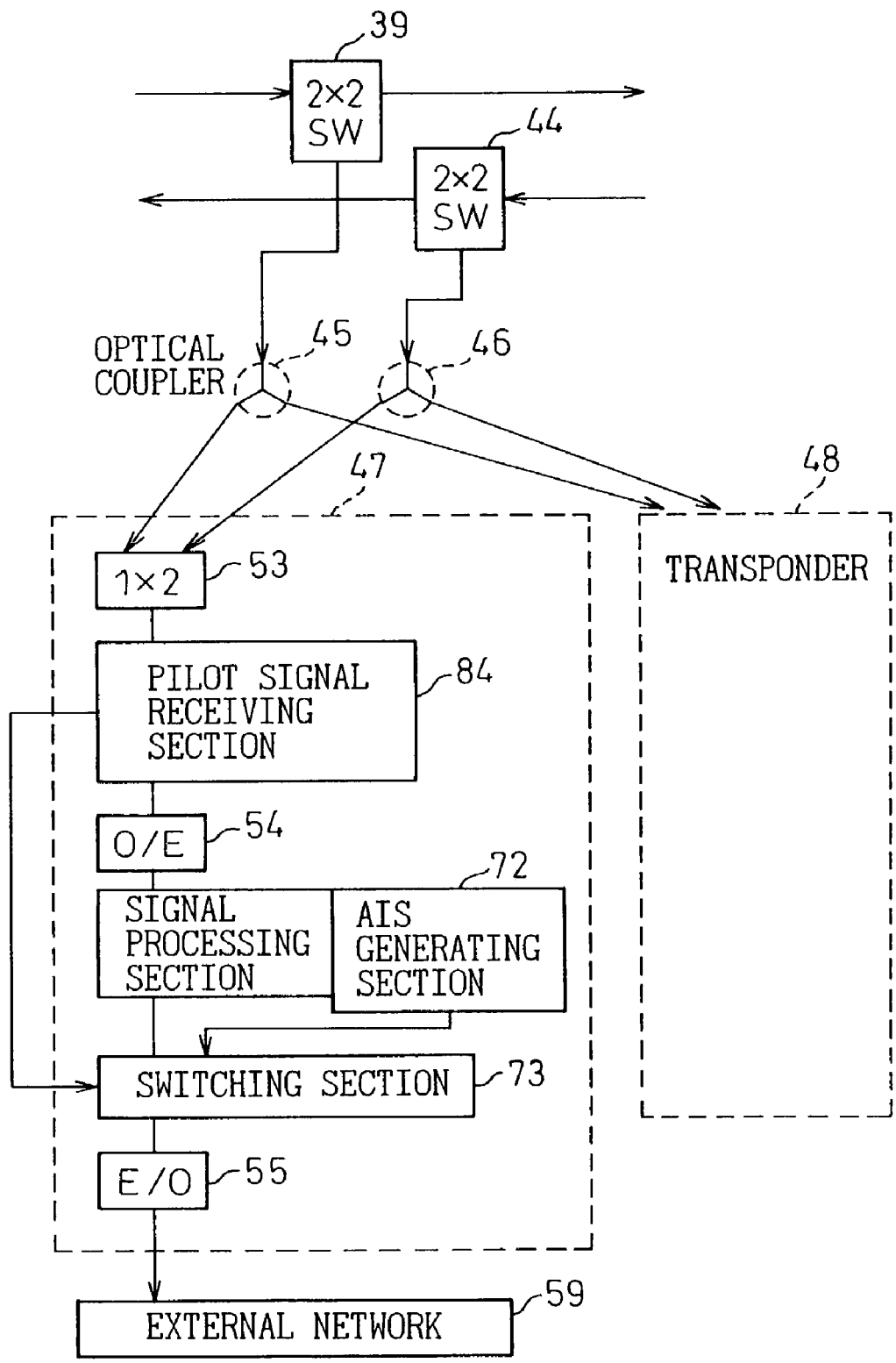
FIG. 18 is a diagram showing an example of a specific circuit configuration (1) at the side of a receiving end node in the third embodiment.

FIG. 18 shows an example of a specific circuit configuration (1) at the side of receiving end node in the third embodiment.

Though an AIS generating section 72 and a switching section 73 that constitutes the interruption means of the present invention are provided in each of the transponders 47 and 48 at the drop side in this embodiment, a pilot signal receiving section 84 for controlling the switching section 73 is further provided in this example. The pilot signal receiving section 84 decodes the pilot signal (modulation signal) superimposed on the received signal and, if the information about the receiving end identifier specifies the receiving end node itself, controls the switching section 73 to select the side of the signal processing section. As a result, the interruption state is released. On the contrary, if the information specifies the node other than the receiving end node itself, the pilot signal receiving section 84 selects the side of the AIS generating section 72 to enter or maintain the interrupted state.

Figure 21:
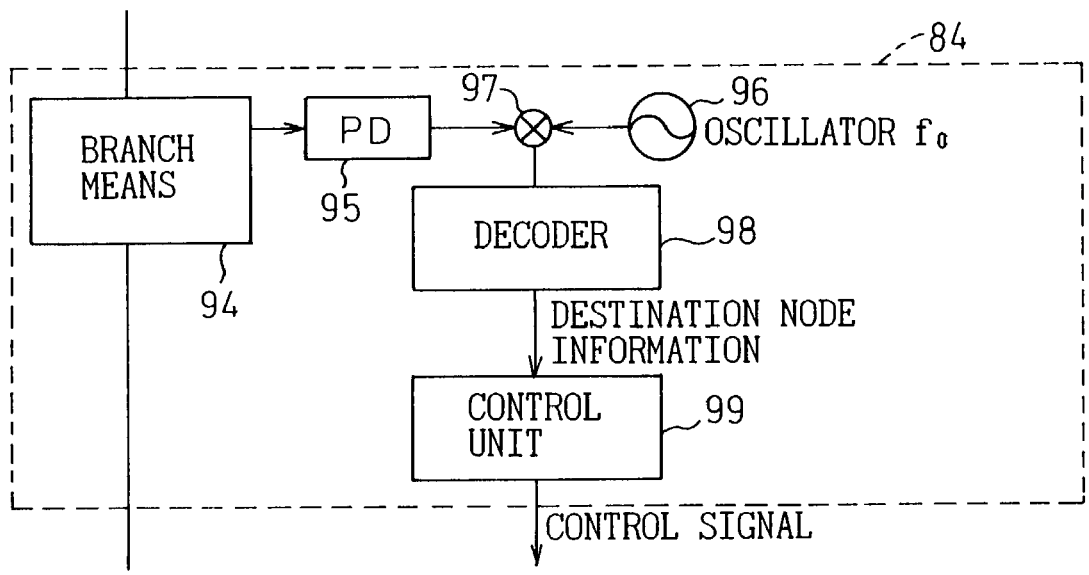
FIG. 21 is a diagram showing an exemplary configuration of a pilot signal receiving section.

FIG. 21 shows an exemplary configuration of the pilot signal receiving section 84.

In FIG. 21, a portion of the input signal is branched by a branch means 94 such as a coupler and detected by a photo diode (PD) 95. A signal generated in a mixer 97 by mixing the detected signal and a local oscillator frequency signal from an oscillator 96 that has the same frequency ($f_0$) as the one at the transmitting side is decoded to the destination node information (receiving end identifier) by an decoder 98. A control circuit 99 compares the decoded value with an identifier of its own node and, if a match is found, controls the switching section 73 to release the interruption state.

With reference to the operation of the third embodiment, the receiving end node B decodes the pilot signal included in the drop signal from the 2×2 optical switch 39 in the clockwise line route by the pilot signal receiving section 84 in the transponders. From the decoded result, the pilot signal receiving section 84 recognizes that the receiving end identifier information specifies its own node, and therefore controls the switching section 73 to select the side of the signal processing section. On the other hand, the relay node A recognizes that the signal is not destined for the relay node A itself from said decoded result, and therefore controls the switching section 73 to select the side of the AIS generating section 72.

Figure 19:
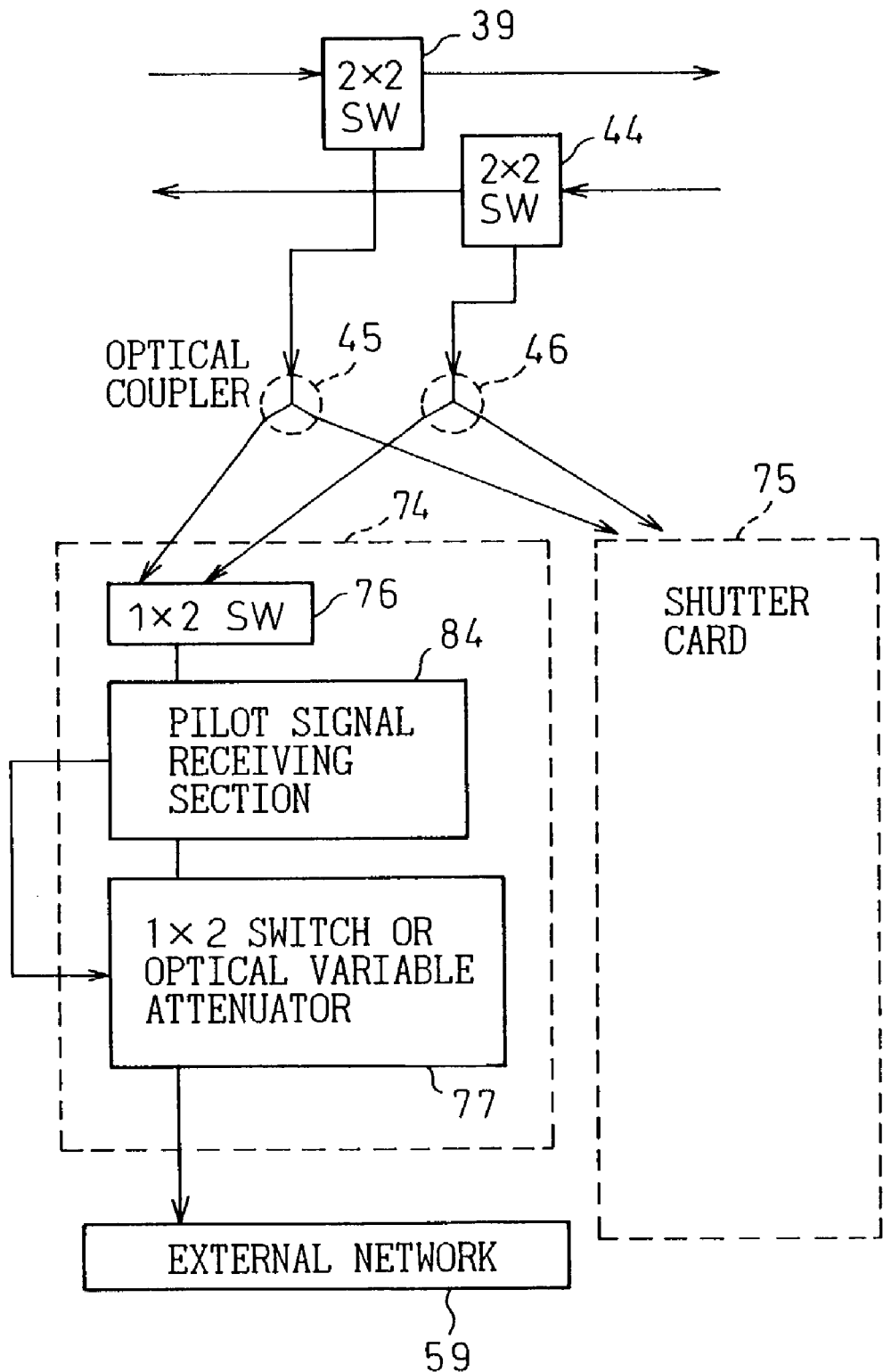
FIG. 19 is a diagram showing an example of another circuit configuration (2) at the side of the receiving end node in the third embodiment.

FIG. 19 shows an example of another circuit configuration (2) at the side of the receiving end node in the third embodiment.

In FIG. 19, shutter cards 74 and 75 are used instead of the transponders. The pilot signal transmitting section 85 is also provided here, which operates similarly to the case shown in FIG. 18, other than in that the pilot signal transmitting section 85 performs control to interrupt the signal to the external network 59 by means of the 1×2 optical switch or optical attenuator 77. With reference to the third embodiment, this example operates similarly to the case shown in FIG. 18. This embodiment is suitable for the direct connection configuration.

When the first to third embodiments are applied to the connection between a plurality of ring networks, the path switching sequence according to each of the embodiments may be performed independently in each of the ring networks.

Figure 22:
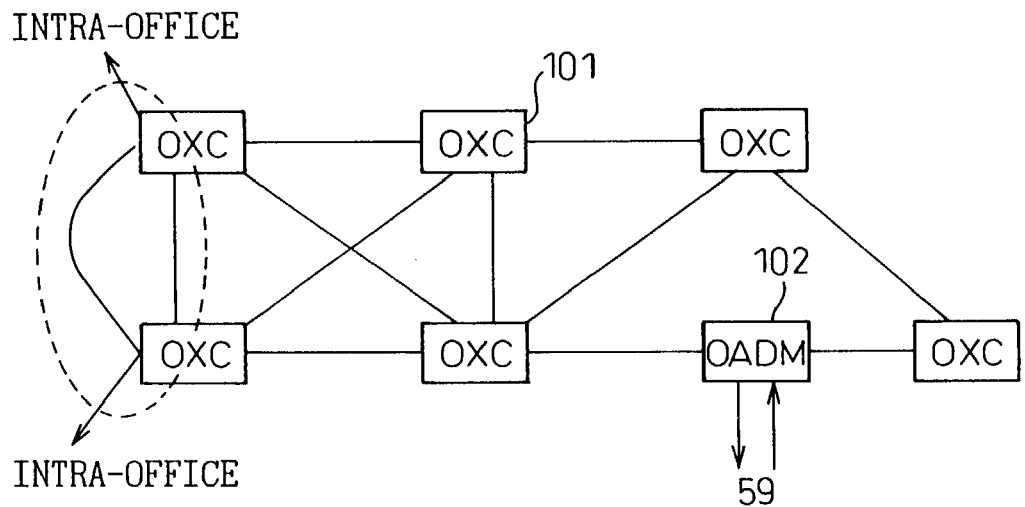
FIG. 22 is a diagram showing an example of a mesh network configured by using optical cross connect devices.
Figure 23:
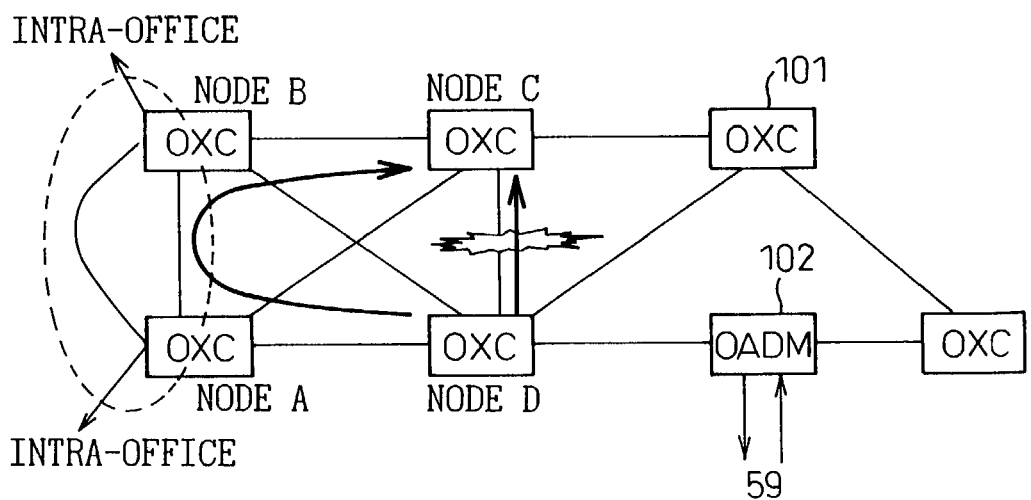
FIG. 23 is a diagram showing an exemplary line route switching of the mesh network when a failure occurs.

FIGS. 22-24 show an embodiment in which the present invention is applied to a mesh network configured by using optical cross connect (OXC) devices.

FIG. 22 shows an example of the mesh network by using the optical cross connect devices 101, FIG. 23 shows an exemplary line route switching of the mesh network when a failure occurs, and FIG. 24 shows an exemplary configuration of the optical cross connect device 101, respectively.

In the mesh network shown in FIG. 22, at the time of a break of a fiber or failure of a device, an alternative path route is retrieved from a database and path switching is performed. At this time, the search of the alternative path is started from optical paths that are not used and then optical paths having a lower priority. Here, though not shown, optical amplifiers may be inserted between the optical cross connect devices 101 as optical repeaters. Further, an optical ADM (OADM) device 102 is used for connecting with the external network 59.

A switch 111 in the optical cross connect device 101 shown in FIG. 24 is an optical matrix switch in a 1+1 redundant configuration branched by couplers 113. Here, though transponders 112 and 114 are shown in the figure, shutter cards may be used instead of the transponders 112 and 114. Further, even the shutter cards may not be provided and said switch 111 may act as the shutter cards.

In FIG. 23, the four optical cross connect devices 101 form logical ring nodes as nodes A-D, respectively. First, a case where the first embodiment of the present invention is applied to this network will be described. When a failure occurs between the node C and the node D due to a break of a fiber or failure of a device and the like, the connection to the downstream of the path to be switched in the receiving end node C is interrupted first. Next, the connection is switched to the nodes B and A at the upstream side successively. Then, the switching is performed in the most upstream node D and after the switching in all nodes is completed, the connection to the downstream side is released in the receiving end node C.

The interruption may be implemented by using the transponders 114 shown in FIG. 24, or the shutter cards 74 shown in FIG. 9, or equivalents, instead of the transponders 114. Alternatively, the interruption may be implemented similarly by combining to a port having no connection in the matrix switch 111. The above description can be applied to the case according to the second embodiment of the present invention.

In the case of the third embodiment of the present invention, as described above, an identifier may be included in a signal, or alternatively, a pilot signal may be used. First, the case in which the identifier is included in the signal will be described. In this example, the identifier that corresponds to an intra-office interface of a specific port in the receiving end node C is inserted at the transmitting side of an intra-office interface of the transmitting end node D. When the receiving end node C detects the identifier of the own node at the receiving side of the intra-office interface, it outputs the signal to the external network. Further, information about the node through which the signal is to be passed may be included, and in this case, when the relay node detects its abnormality, the signal may be interrupted at the corresponding node.

On the other hand, when the pilot signal is used, the configuration shown in FIG. 16 or FIG. 17 described above, which is the embodiment using the transponders or the direct connection, respectively, may be used at the transmitting side of the intra-office interface in the transmitting end node D, and the configuration shown in FIG. 17 or FIG. 18 may be used at the receiving side of the intra-office interface in the receiving end node C. If the receiving end node C does not receive a predetermined data signal including the receiving end identification information, the output to the external network is interrupted.

As described above, according to the present invention, a WDM network that enables high-speed route switching without occurrence of erroneous connection is provided. As a result, prevention of the erroneous connection at the time of line route switching, a feature for switching destinations remotely in wavelength time sharing service and the like can be provided in a metro core ring network and the like.

What is claimed is:

1. An optical communication node that is inserted in each relay position of an optical network having a work side all-optical line route and a protection side all-optical line route, said optical communication node comprising:
   an external network that is accommodated therein;
   interruption means for interrupting an all-optical connection between said optical network and said external network;
   a control section controlling the interruption means based on a switching control signal through an optical supervisory channel (OSC) from an upstream supervisory control section; and
   dummy signal means for generating and outputting a dummy signal, wherein said dummy signal means sends the dummy signal to said optical network and/or said external network to which signal transmission is stopped by said interruption means, wherein
   said interruption means interrupts the all-optical connection until a sequence of changing said all-optical line routes of a plurality of optical communication nodes inserted in said optical network is completed when the all-optical line route setting of said all-optical line routes is changed, and
   the interruption of said interruption means in a downstream optical communication node is maintained until (i) an all-optical line route in the downstream optical communication node is first optically switched through said OSC, while transferring a switching signal through said OSC for the all-optical line route from said downstream optical communication node to each other upstream optical communication node inserted in said optical network and (ii) the switching of the all-optical line route by the OSC in each of said other upstream optical communication nodes is completed.

2. An optical network system including an optical communication node that is inserted in each relay position of an optical network having a work side all-optical line route and a protection side all-optical line route, comprising:
   an external network that is accommodated therein;
   interruption means for interrupting at least one signal either output from said external network to said optical network or output from said optical network to said external network over an all-optical path;
   a control section controlling the interruption means based on a switching control signal through an optical supervisory channel (OSC) from an upstream supervisory control section; and
   dummy signal means for generating and outputting a dummy signal, wherein said dummy signal means sends the dummy signal to said optical network and/or said external network to which signal transmission is stopped by said interruption means, wherein
   said interruption means interrupts said at least one signal until a sequence of changing said all-optical line routes of a plurality of optical communication nodes inserted in said optical network is completed when the all-optical line route setting of said all-optical line routes is changed, and
   the interruption of said interruption means in a downstream optical communication node is maintained until (i) an all-optical line route in the downstream optical communication node is first optically switched through said OSC, then a switching signal for the all-optical line route is transmitted through said OSC from said downstream optical communication node to each other upstream optical communication node inserted in said optical network and (ii) the switching of the all-optical line route by the OSC in each of said other upstream optical communication nodes is completed.

3. A method of preventing erroneous connection of an optical communication node, that is inserted in each relay position of an optical network having a work side all-optical line route and a protection side all-optical line route, an optical network having an external network that is accommodated therein, and a control section, said method comprising:
   interrupting at least one signal either output from said external network to said optical network or output from said optical network to said external network over an all-optical path, wherein interrupting said at least one signal until a sequence of changing said all-optical line routes of a plurality of optical communication nodes inserted in said optical network is completed when the all-optical line route setting of said all-optical line routes is changed;

controlling, by the control section, the interrupting based on a switching control signal through an optical supervisory channel (OSC) from an upstream supervisory control section;

generating and outputting a dummy signal, wherein the dummy signal is sent to said optical network and/or said external network to which signal transmission is stopped by said interrupting; and maintaining the interruption of said interruption operation in a downstream optical communication node until (i) an all-optical line route in the downstream optical communication node is first optically switched through said OSC, while transmitting a switching signal through said OSC for the all-optical line route from said downstream optical communication node to each other upstream optical communication node inserted in said optical network and (ii) switching of the all-optical line route by the OSC in each of said other upstream optical communication nodes is completed.

4. An optical communication node that is inserted in each relay position of an optical network having a work side all-optical line route and a protection side all-optical line route, said optical communication node comprising:

an external network that is accommodated therein;

an interruption unit interrupting an all-optical connection between said optical network and said external network;

a control section controlling the interruption means based on a switching control signal through an optical supervisory channel (OSC) from an upstream supervisory control section; and a dummy signaler generating and outputting a dummy signal, wherein said dummy signal means sends the dummy signal to said optical network and/or said external network to which signal transmission is stopped by said interruption unit, wherein said interruption unit interrupts the all-optical connection until a sequence of changing said all-optical line routes of a plurality of optical communication nodes inserted in said optical network is completed when the all-optical line route setting of said all-optical line routes is changed, and the interruption of said interruption unit in a downstream optical communication node is maintained until (i) an all-optical line route in the downstream optical communication node is first optically switched through said OSC, while transferring a switching signal through said OSC for the all-optical line route from said downstream optical communication node to each other upstream optical communication node inserted in said optical network and (ii) the switching of the all-optical line route by the OSC in each of said other upstream optical communication nodes is completed.

5. An optical communication node that is inserted in each relay position of an optical network having a work side all-optical line route and a protection side all-optical line route, said optical communication node comprising:

an external network that is accommodated therein;

an interrupter interrupting an all-optical connection between said optical network and said external network;

a control section controlling the interrupter based on a switching control signal through an optical supervisory channel (OSC) from an upstream supervisory control section; and a dummy signaler generating and outputting a dummy signal, wherein said dummy signaler sends the dummy signal to said optical network and/or said external network to which signal transmission is stopped by said interrupter, wherein said interrupter interrupts the all-optical connection until a sequence of changing said all-optical line routes of a plurality of optical communication nodes inserted in said optical network is completed when the all-optical line route setting of said all-optical line routes is changed, and the interruption of said interrupter in a downstream optical communication node is maintained until (i) an all-optical line route in the downstream optical communication node is first optically switched through said OSC, while transferring a switching signal through said OSC for the all-optical line route from said downstream optical communication node to each other upstream optical communication node inserted in said optical network and (ii) the switching of the all-optical line route by the OSC in each of said other upstream optical communication nodes is completed.

6. An optical network system including an optical communication node that is inserted in each relay position of an optical network having a work side all-optical line route and a protection side all-optical line route, comprising:

an external network that is accommodated therein;

an interrupter interrupting at least one signal either output from said external network to said optical network or output from said optical network to said external network over an all-optical path;

a control section controlling the interrupter based on a switching control signal through an optical supervisory channel (OSC) from an upstream supervisory control section; and a dummy signaler generating and outputting a dummy signal, wherein said dummy signaler sends the dummy signal to said optical network and/or said external network to which signal transmission is stopped by said interrupter, wherein said interrupter interrupts said at least one signal until a sequence of changing said all-optical line routes of a plurality of optical communication nodes inserted in said optical network is completed when the all-optical line route setting of said all-optical line routes is changed, and the interruption of said interrupter in a downstream optical communication node is maintained until (i) an all-optical line route in the downstream optical communication node is first optically switched through said OSC, then a switching signal for the all-optical line route is transmitted through said OSC from said downstream optical communication node to each other upstream optical communication node inserted in said optical network and (ii) the switching of the all-optical line route by the OSC in each of said other upstream optical communication nodes is completed.

\* \* \* \* \*